US012639964B2

(12) United States Patent
Endo

(10) Patent No.: US 12,639,964 B2
(45) Date of Patent: May 26, 2026

(54) VIDEO MANUAL GENERATION DEVICE, VIDEO MANUAL GENERATION METHOD, AND STORAGE MEDIUM STORING VIDEO MANUAL GENERATION PROGRAM

(71) Applicant: Mitsubishi Electric Corporation, Tokyo (JP)

(72) Inventor: Yukinori Endo, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 287 days.

(21) Appl. No.: 18/381,540

(22) Filed: Oct. 18, 2023

(65) Prior Publication Data

US 2024/0071113 A1     Feb. 29, 2024

Related U.S. Application Data

(63) Continuation of application No. PCT/JP2021/019151, filed on May 20, 2021.

(51) Int. Cl.
*G06V 20/70*          (2022.01)
*G06T 7/70*           (2017.01)
(Continued)

(52) U.S. Cl.
CPC ................. *G06V 20/70* (2022.01); *G06T 7/70* (2017.01); *G06V 20/52* (2022.01); *G10L 15/04* (2013.01)

(58) Field of Classification Search
CPC ........ G06V 20/70; G06V 20/52; G06V 40/20; G06V 20/46; G06V 20/20; G06V 20/60;
(Continued)

(56) References Cited

U.S. PATENT DOCUMENTS

2021/0019955 A1     1/2021   Aga et al.

FOREIGN PATENT DOCUMENTS

| JP | 2008225883 A | * | 9/2008 |
| JP | 2019-36306 A | | 3/2019 |

(Continued)

OTHER PUBLICATIONS

Associating Semantically Structured Cooking Videos with Their Preparation Steps. Miura et al. (Year: 2003).*

(Continued)

*Primary Examiner* — Delomia L Gilliard
(74) *Attorney, Agent, or Firm* — Birch, Stewart, Kolasch & Birch, LLP

(57)          ABSTRACT

A video manual generation device includes a document analysis unit, a video analysis unit, a link information generation unit to collect first sets each being a set of a noun and a verb from text information data, to collect second sets each being a set of an object and an action from object information data and action information data, to search those sets for a first set and a second set in which the noun and the object correspond to each other and the verb and the action correspond to each other, and to generate link information data indicating correspondence between a position in the work procedure where the first set obtained by the search is described and a scene in a video that includes the second set obtained by the search, and a video manual generation unit to generate video manual data based on the link information data.

8 Claims, 29 Drawing Sheets

(51) Int. Cl.
    *G06V 20/52*     (2022.01)
    *G10L 15/04*     (2013.01)

(58) Field of Classification Search
    CPC . G06T 7/70; G10L 15/04; G10L 15/26; G06F
                                               16/73
    See application file for complete search history.

(56)                 References Cited

FOREIGN PATENT DOCUMENTS

| | | | | |
|---|---|---|---|---|
| JP | 2020177534 A | * | 10/2020 | |
| WO | WO-2019181263 A1 | * | 9/2019 | .............. G09G 3/20 |

OTHER PUBLICATIONS

A Method of Recipe to Cooking Video Mapping for Automated Cooking Content Construction. Yamakata et al. (Year: 2007).*

International Search Report for PCT/JP2021/019151 (PCT/ISA/210) mailed on Jul. 20, 2021.

Miura et al., "Associating semantically structured cooking videos with their preparation steps", Published Nov. 1, 2003, vol. J86-D-II, No. 11, pp. 1647-1656.

Notice of Reasons for Refusal issued in Japanese Patent Application No. 2021-554980 dated Nov. 16, 2021.

Yamakata et al., "A Method of Recipe to Cooking Video Mapping for Automated Cooking Content Construction", vol. J90-D, No. 10, 2007, pp. 2817-2829.

* cited by examiner

FIG. 9

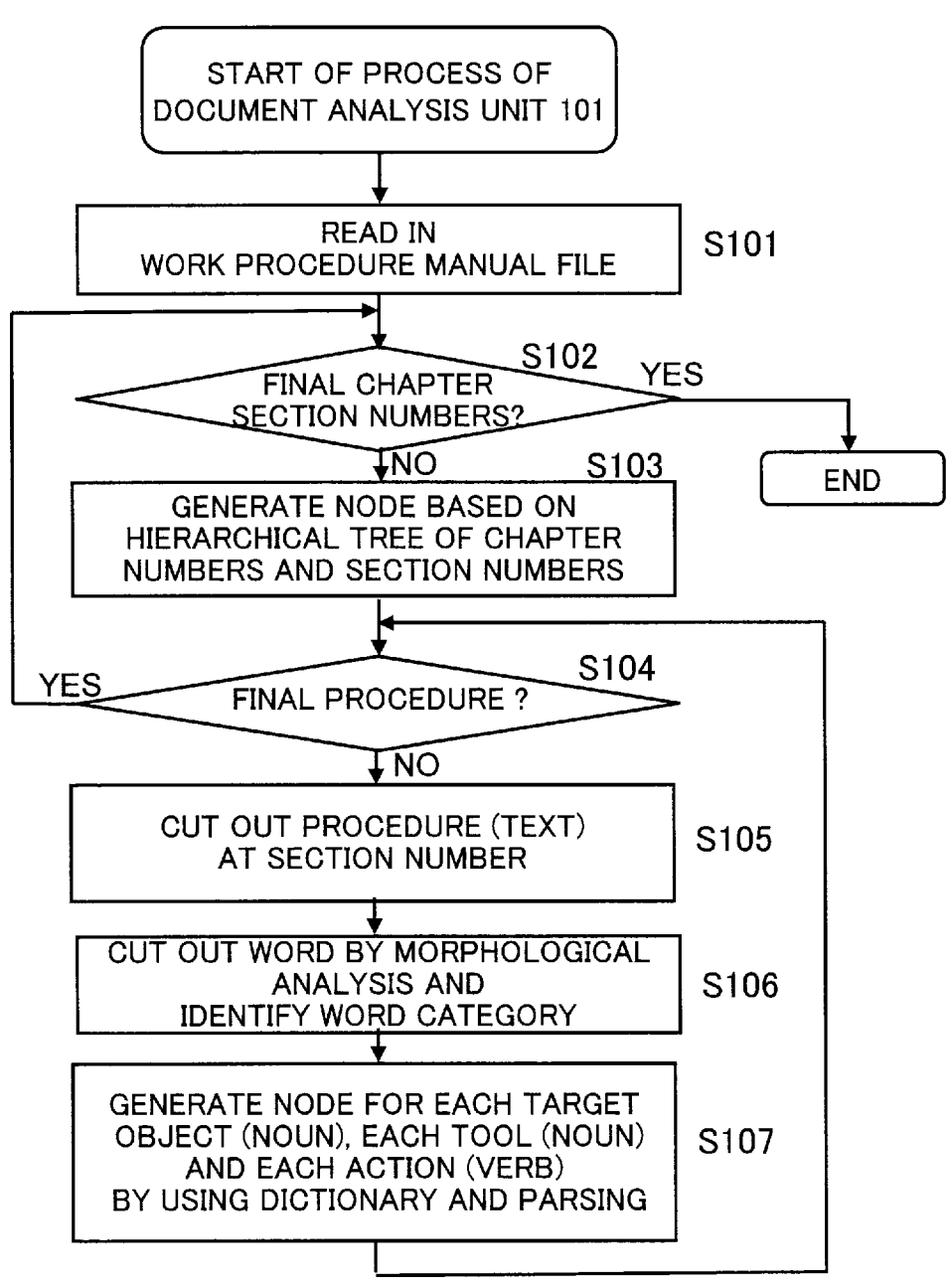

START OF PROCESS OF
DOCUMENT ANALYSIS UNIT 101

READ IN
WORK PROCEDURE MANUAL FILE          S101

FINAL CHAPTER
SECTION NUMBERS?          S102          YES

END

NO          S103

GENERATE NODE BASED ON
HIERARCHICAL TREE OF CHAPTER
NUMBERS AND SECTION NUMBERS

YES          FINAL PROCEDURE ?          S104

NO

CUT OUT PROCEDURE (TEXT)
AT SECTION NUMBER          S105

CUT OUT WORD BY MORPHOLOGICAL
ANALYSIS AND
IDENTIFY WORD CATEGORY          S106

GENERATE NODE FOR EACH TARGET
OBJECT (NOUN), EACH TOOL (NOUN)
AND EACH ACTION (VERB)
BY USING DICTIONARY AND PARSING          S107

FIG. 17

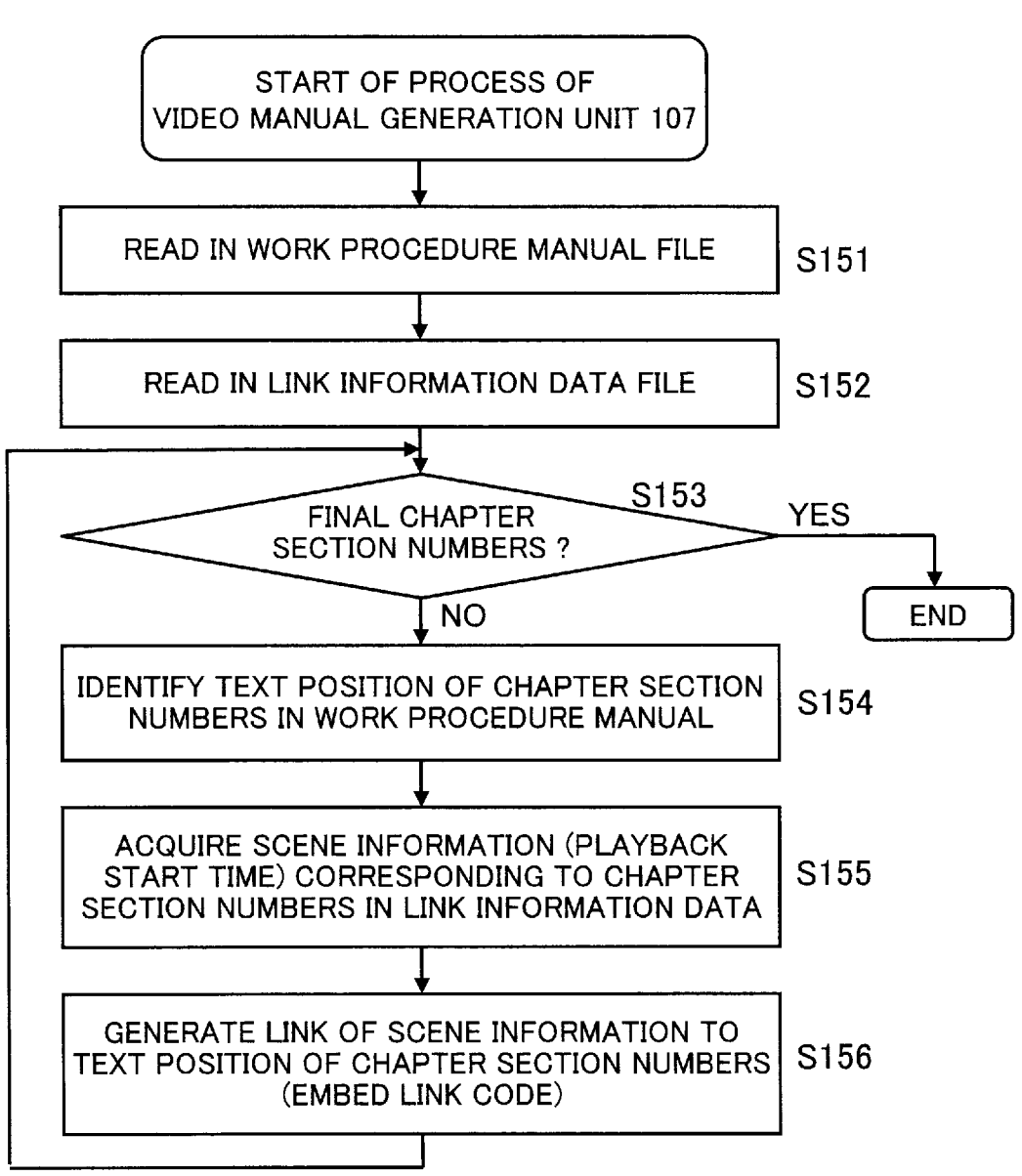

START OF PROCESS OF
VIDEO MANUAL GENERATION UNIT 107

READ IN WORK PROCEDURE MANUAL FILE    S151

READ IN LINK INFORMATION DATA FILE    S152

FINAL CHAPTER
SECTION NUMBERS ?    S153    YES

END

NO

IDENTIFY TEXT POSITION OF CHAPTER SECTION
NUMBERS IN WORK PROCEDURE MANUAL    S154

ACQUIRE SCENE INFORMATION (PLAYBACK
START TIME) CORRESPONDING TO CHAPTER
SECTION NUMBERS IN LINK INFORMATION DATA    S155

GENERATE LINK OF SCENE INFORMATION TO
TEXT POSITION OF CHAPTER SECTION NUMBERS
(EMBED LINK CODE)    S156

FIG. 18

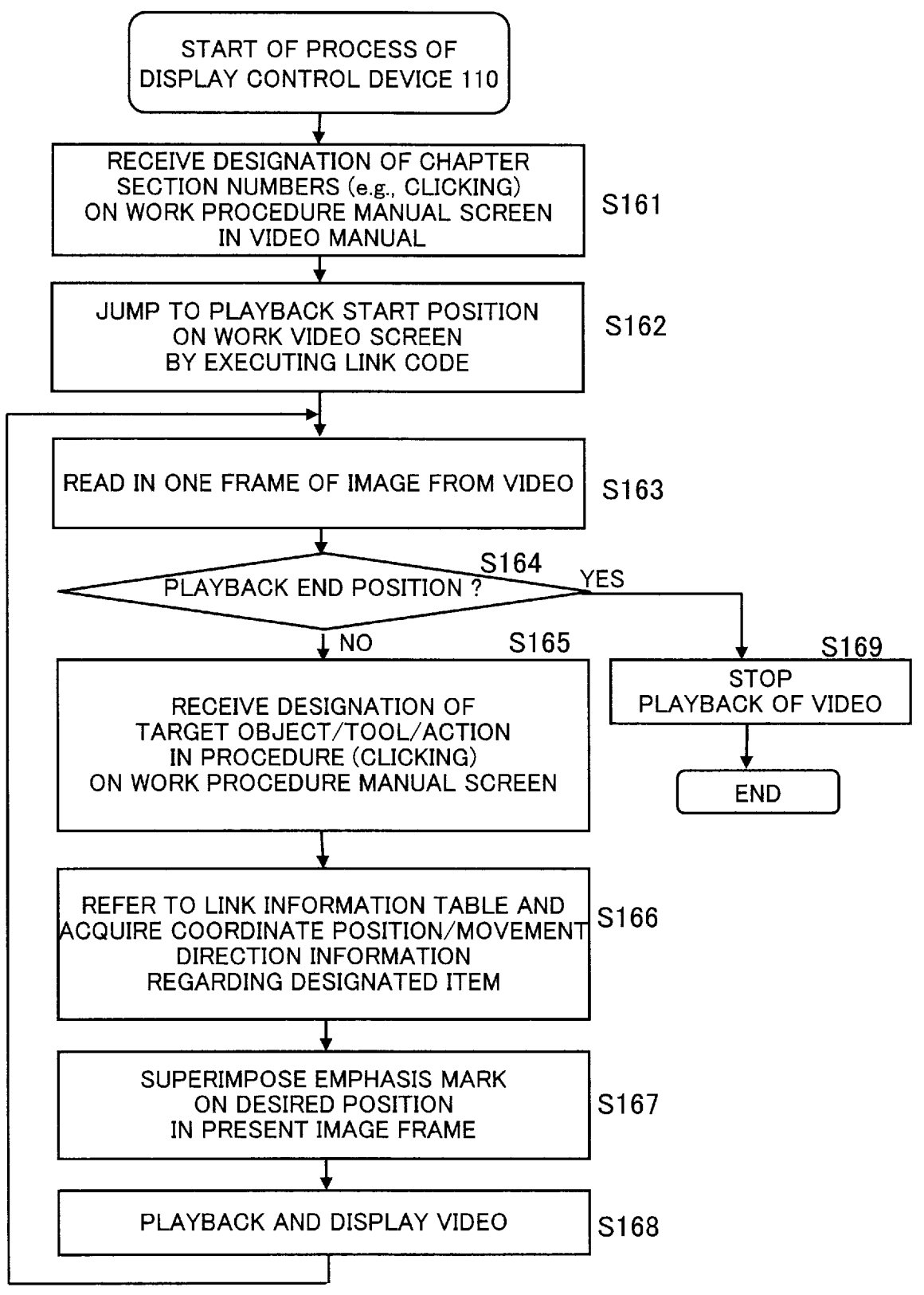

START OF PROCESS OF
DISPLAY CONTROL DEVICE 110

RECEIVE DESIGNATION OF CHAPTER
SECTION NUMBERS (e.g., CLICKING)
ON WORK PROCEDURE MANUAL SCREEN
IN VIDEO MANUAL       S161

JUMP TO PLAYBACK START POSITION
ON WORK VIDEO SCREEN
BY EXECUTING LINK CODE       S162

READ IN ONE FRAME OF IMAGE FROM VIDEO       S163

S164
PLAYBACK END POSITION ?       YES

NO       S165

RECEIVE DESIGNATION OF
TARGET OBJECT/TOOL/ACTION
IN PROCEDURE (CLICKING)
ON WORK PROCEDURE MANUAL SCREEN

S169
STOP
PLAYBACK OF VIDEO

END

REFER TO LINK INFORMATION TABLE AND
ACQUIRE COORDINATE POSITION/MOVEMENT
DIRECTION INFORMATION
REGARDING DESIGNATED ITEM       S166

SUPERIMPOSE EMPHASIS MARK
ON DESIRED POSITION
IN PRESENT IMAGE FRAME       S167

PLAYBACK AND DISPLAY VIDEO       S168

FIG. 19

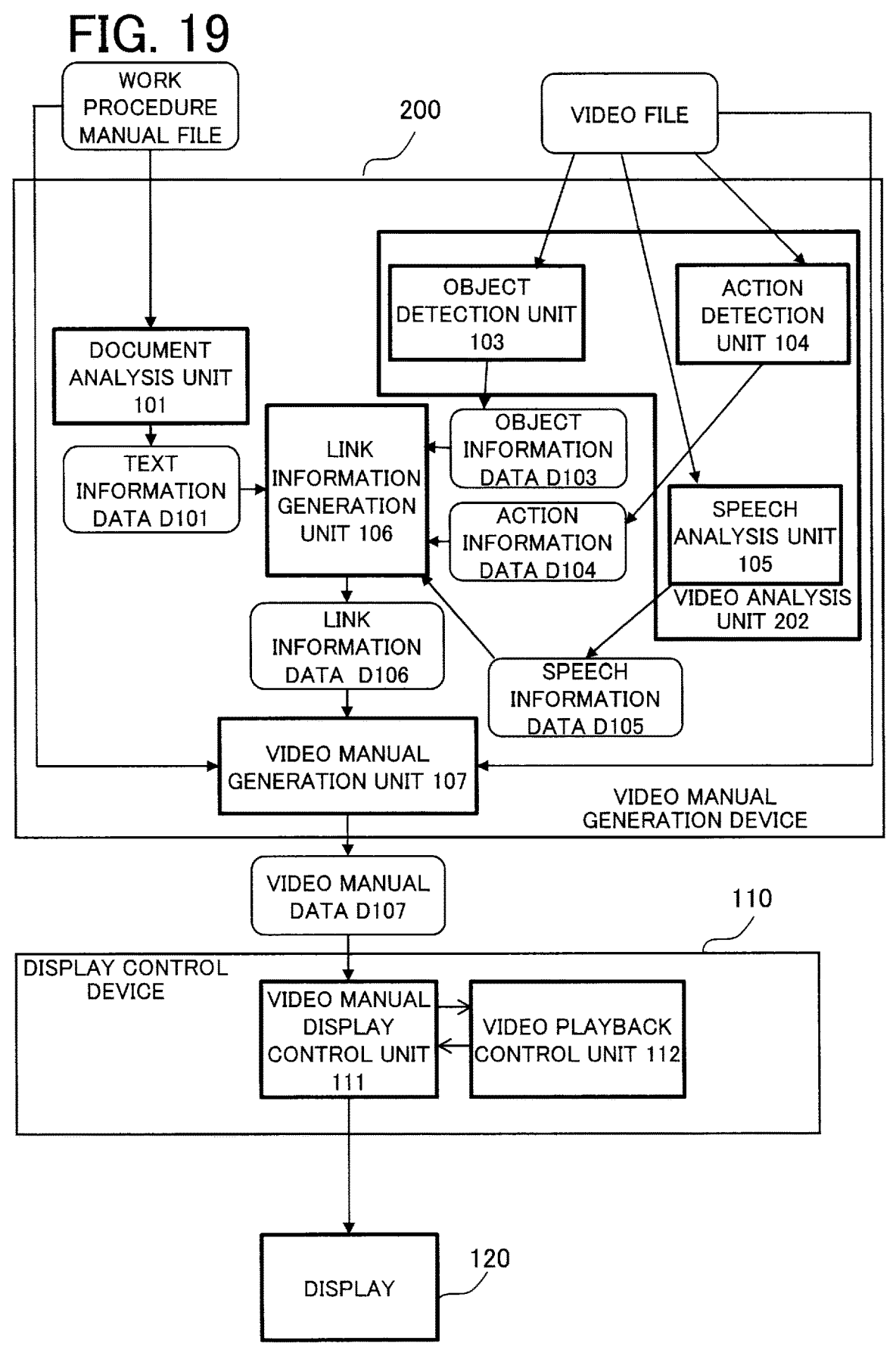

WORK PROCEDURE MANUAL FILE

VIDEO FILE

200

OBJECT DETECTION UNIT 103

ACTION DETECTION UNIT 104

DOCUMENT ANALYSIS UNIT 101

TEXT INFORMATION DATA D101

LINK INFORMATION GENERATION UNIT 106

OBJECT INFORMATION DATA D103

ACTION INFORMATION DATA D104

SPEECH ANALYSIS UNIT 105

VIDEO ANALYSIS UNIT 202

LINK INFORMATION DATA D106

SPEECH INFORMATION DATA D105

VIDEO MANUAL GENERATION UNIT 107

VIDEO MANUAL GENERATION DEVICE

VIDEO MANUAL DATA D107

110

DISPLAY CONTROL DEVICE

VIDEO MANUAL DISPLAY CONTROL UNIT 111

VIDEO PLAYBACK CONTROL UNIT 112

120

DISPLAY

Figure 30:
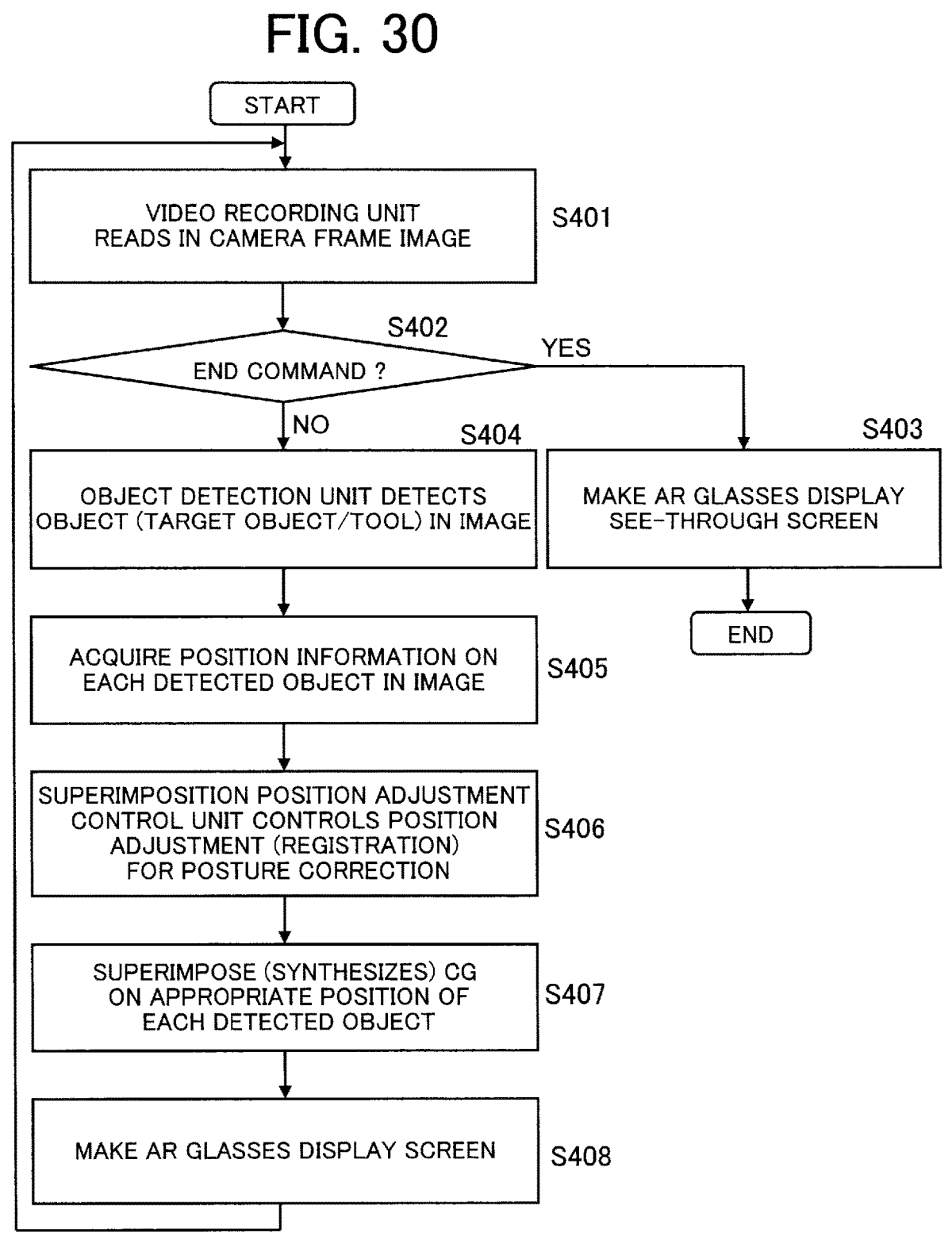

START

VIDEO RECORDING UNIT
READS IN CAMERA FRAME IMAGE     S401

S402

END COMMAND ?     YES

NO

S404

OBJECT DETECTION UNIT DETECTS
OBJECT (TARGET OBJECT/TOOL) IN IMAGE

S403

MAKE AR GLASSES DISPLAY
SEE-THROUGH SCREEN

END

ACQUIRE POSITION INFORMATION ON
EACH DETECTED OBJECT IN IMAGE     S405

SUPERIMPOSITION POSITION ADJUSTMENT
CONTROL UNIT CONTROLS POSITION
ADJUSTMENT (REGISTRATION)
FOR POSTURE CORRECTION     S406

SUPERIMPOSE (SYNTHESIZES) CG
ON APPROPRIATE POSITION OF
EACH DETECTED OBJECT     S407

MAKE AR GLASSES DISPLAY SCREEN     S408

VIDEO MANUAL GENERATION DEVICE, VIDEO MANUAL GENERATION METHOD, AND STORAGE MEDIUM STORING VIDEO MANUAL GENERATION PROGRAM

CROSS-REFERENCE TO RELATED APPLICATION

This application is a continuation application of International Application No. PCT/JP2021/019151 having an international filing date of May 20, 2021.

BACKGROUND OF THE INVENTION

1. Field of the Invention

The present disclosure relates to a video manual generation device, a video manual generation method and a video manual generation program.

2. Description of the Related Art

There has been proposed a method of generating a video manual as a multimedia manual using text and video. See Patent Reference 1, for example. In this method, the video manual is generated by analyzing video, generating an event list made up of time information and object information (e.g., tool name) regarding times when a worker is using a tool, a component or the like, and assigning the time information regarding events to the video.

Patent Reference 1: Japanese Patent Application Publication No. 2008-225883.

However, in the above-described video manual, there is a problem in that correspondence between an object (e.g., a target object, a tool) and an action of a person (e.g., movement of the worker) is hard to understand.

SUMMARY OF THE INVENTION

An object of the present disclosure is to provide a video manual generation device, a video manual generation method and a video manual generation program capable of generating a video manual in which the correspondence between the object and the action of the person is easily understandable.

A video manual generation device in the present disclosure includes processing circuitry to analyze a work procedure manual file in which a work procedure is described and to generate text information data indicating a structure of text included in the work procedure manual file; to analyze a video file of video that is obtained by camera recording of a person executing a work according to the work procedure, to generate object information data including an on-screen coordinate position and a name of an object, the on-screen coordinate position representing positions of a target object of the work, a tool used for the work, and a body part of the person on each frame image, and to generate action information data representing an action of the person included in the video, the action including a coordinate position of the body part and a movement direction of the body part; to collect first sets each being a set of a noun and a verb included in the text from the text information data, to collect second sets each being a set of the on-screen coordinate position and the name of the object and the action included in the video from the object information data and the action information data, to search the collected first sets and the collected second sets for a first set and a second set in which the noun and the name of the object correspond to each other and the verb and the action correspond to each other, and to generate link information data indicating correspondence between a position in the work procedure where the first set obtained by the search is described and a scene in the video that includes the second set obtained by the search; and to generate video manual data, for causing a display to display a video manual including the work procedure, the video, the noun displayed in the vicinity of the object in each frame image of the video, and the verb displayed in the vicinity of the body part executing the action corresponding to the verb in each frame image of the video, based on the link information data.

A video manual generation method in the present disclosure is a method executed by a video manual generation device that generates video manual data. The video manual generation method includes analyzing a work procedure manual file in which a work procedure is described and generating text information data indicating a structure of text included in the work procedure manual file; analyzing a video file of video that is obtained by camera recording of a person executing a work according to the work procedure, generating object information data including an on-screen coordinate position and a name of an object, the on-screen coordinate position representing positions of a target object of the work, a tool used for the work, and a body part of the person on each frame image, and generating action information data representing an action of the person included in the video, the action including a coordinate position of the body part and a movement direction of the body part; collecting first sets each being a set of a noun and a verb included in the text from the text information data, collecting second sets each being a set of the on-screen coordinate position and the name of the object and the action included in the video from the object information data and the action information data, searching the collected first sets and the collected second sets for a first set and a second set in which the noun and the name of the object correspond to each other and the verb and the action correspond to each other, and generating link information data indicating correspondence between a position in the work procedure where the first set obtained by the search is described and a scene in the video that includes the second set obtained by the search; and generating video manual data, for causing a display to display a video manual including the work procedure, the video, the noun displayed in the vicinity of the object in each frame image of the video, and the verb displayed in the vicinity of the body part executing the action corresponding to the verb in each frame image of the video, based on the link information data.

According to the present disclosure, a video manual in which the correspondence between the object and the action of the person is easily understandable can be generated.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 9 is a flowchart showing a generation process of the text information data executed by the document analysis unit;

FIG. 17 is a flowchart showing a generation process of the video manual executed by a video manual generation unit;

FIG. 18 is a flowchart showing a video manual display process executed by the display control device;

FIG. 19 is a functional block diagram schematically showing the configuration of a video manual generation device according to a second embodiment;

FIG. 22 is a diagram showing an example of a tree structure of the speech information data generated by the speech analysis unit of the video manual generation device according to the second embodiment;

FIG. 27 is a functional block diagram schematically showing the configuration of a video manual generation device according to a fourth embodiment;

FIG. 30 is a flowchart showing a process executed by a superimposition position adjustment control unit of the video manual generation device according to the fourth embodiment.

DETAILED DESCRIPTION OF THE INVENTION

A video manual generation device, a video manual generation method and a video manual generation program according to each embodiment will be described below with reference to the drawings. The following embodiments are just examples and it is possible to appropriately combine embodiments and appropriately modify each embodiment.

First Embodiment

Figure 1:
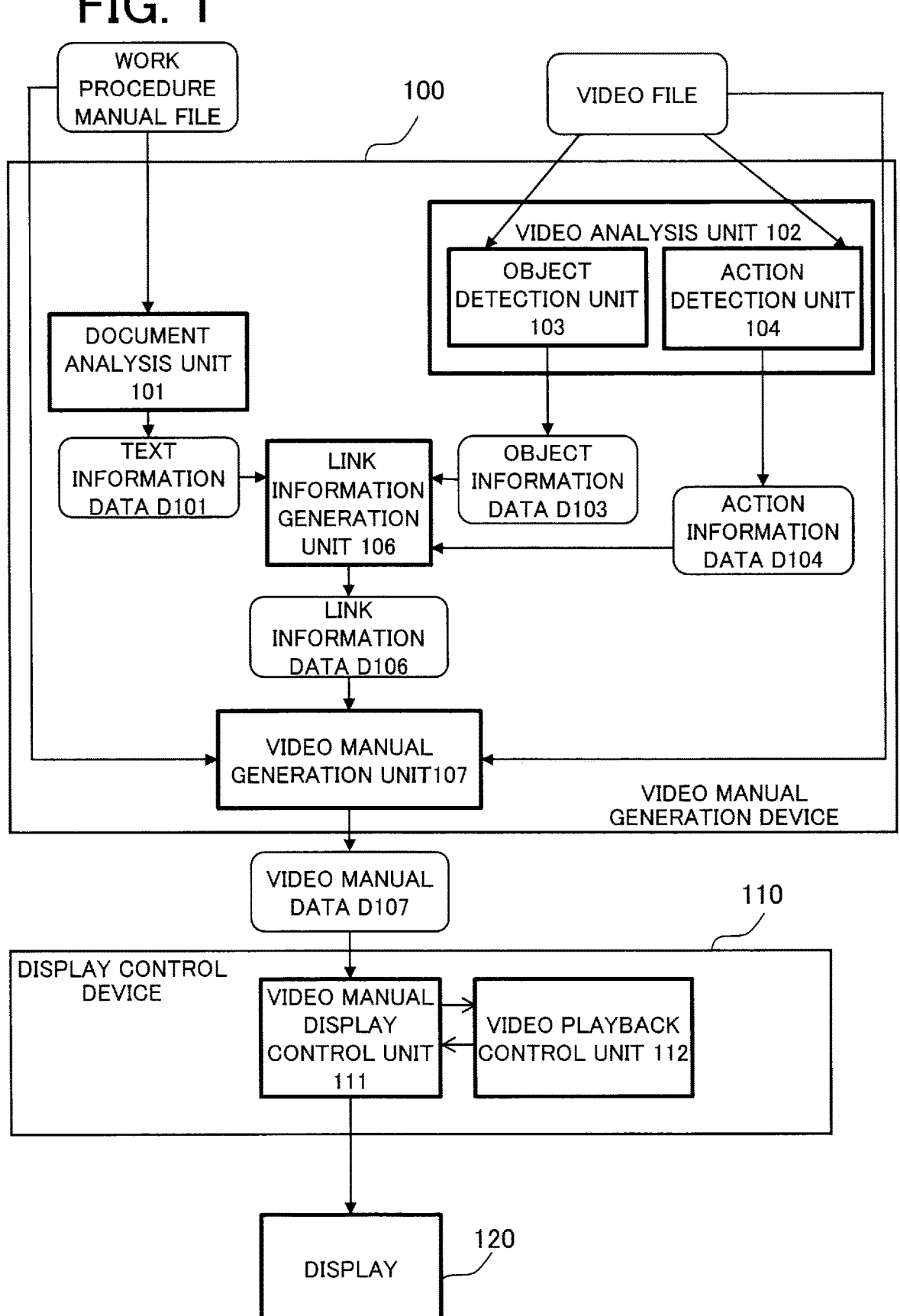
FIG. 1 is a functional block diagram schematically showing the configuration of a video manual generation device according to a first embodiment.

FIG. 1 is a functional block diagram schematically showing the configuration of a video manual generation device 100 according to a first embodiment. The video manual generation device 100 is a device capable of executing a video manual generation method according to the first embodiment. Video manual data D107 generated by the video manual generation device 100 is outputted to a display control device 110. The display control device 110 includes a video playback control unit 112 that executes control of video playback and a video manual display control unit 111 that controls a video manual display operation. The display control device 110 makes a display 120 as an image display device display a video manual. The video manual generation device 100, the display control device 110 and the display 120 constitute a video manual presentation system that presents the video manual to a person (e.g., worker). Further, the display control device 110 can also be provided as a part of the video manual generation device 100.

As shown in FIG. 1, the video manual generation device 100 includes a document analysis unit 101, a video analysis unit 102, a link information generation unit 106 and a video manual generation unit 107. The video analysis unit 102 includes an object detection unit 103 and an action detection unit 104.

The document analysis unit 101 analyzes a work procedure manual file in which a work procedure manual is described and generates text information data D101 indicating a structure of text included in the work procedure manual file. The document analysis unit 101 collects nouns and verbs included in the text. For example, the noun is a word indicating the name of an object, and the verb is a word indicating an action of a person (e.g., worker).

The video analysis unit 102 analyzes a video file of video that captured work according to a work procedure. The object detection unit 103 of the video analysis unit 102 detects an object included in the video and thereby generates object information data D103 representing the object. The action detection unit 104 of the video analysis unit 102 detects the action of a person included in the video and thereby generates action information data D104 representing the action. The object includes at least one of a target object of the work, a tool used for the work, and a body part of the person.

The link information generation unit 106 collects first sets each being a set of a noun and a verb included in the text from the text information data D101, and collects second sets each being a set of an object and an action of a person included in the video from the object information data D103 and the action information data D104. The link information generation unit 106 searches the collected first sets (150 in FIG. 5 which will be explained later) and the collected second sets (160a, 160b in FIG. 6 and FIG. 7 which will be explained later) for a first set and a second set in which the noun and the object correspond to each other and the verb and the action correspond to each other. The link information generation unit 106 generates link information data D106 indicating correspondence between a position (151 in FIG. 8 which will be explained later) in the work procedure manual where the first set obtained by the search is described and a scene (161 in FIG. 8 which will be explained later) in the video that includes the second set obtained by the search.

The video manual generation unit 107 generates the video manual data D107, to be used for causing the display to display a video manual including the work procedure, the video, the noun and the verb, based on the work procedure file, the video file and the link information data D106.

Figure 2:
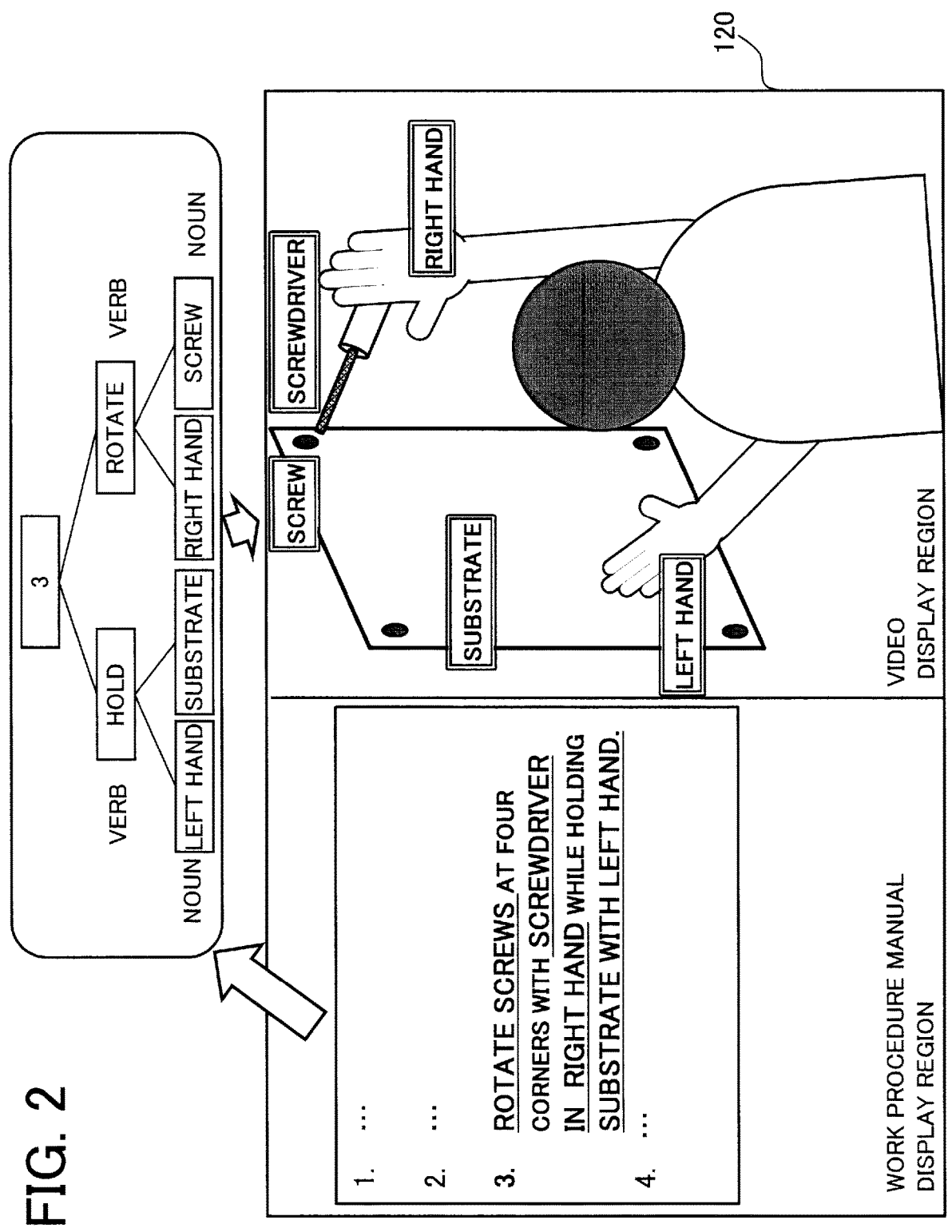
FIG. 2 is a diagram showing an example (No. 1) of a video manual generated by the video manual generation device according to the first embodiment.
Figure 3:
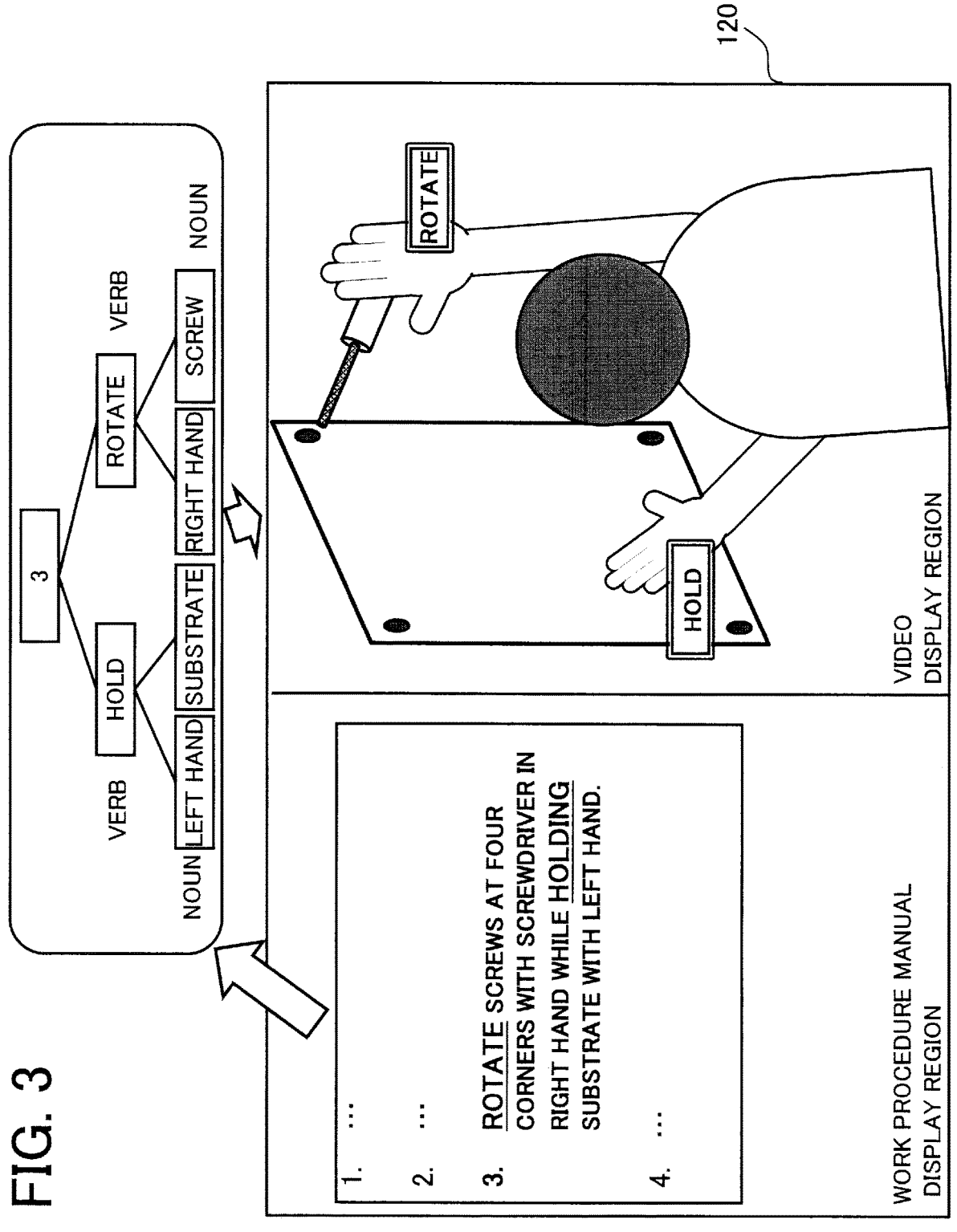
FIG. 3 is a diagram showing an example (No. 2) of the video manual generated by the video manual generation device according to the first embodiment.

FIG. 2 and FIG. 3 are diagrams showing examples (No. 1 and No. 2) of the video manual generated by the video manual generation device 100 and displayed by the display 120. In FIG. 2 and FIG. 3, the contents of the work procedure manual are displayed on the left half of the display 120, and the video is displayed on the right half of the display 120. FIG. 2 shows an example of extracting nouns "left hand", "substrate", "right hand", "screwdriver" and "screw" from the text "rotate screws at four corners with a screwdriver in the right hand while holding the substrate with the left hand" in an item 3 of the work procedure manual and displaying a corresponding noun in the vicinity of each of a target object (e.g., substrate or screw) of the work, a tool (e.g., implement) used for the work, a body part (e.g., left hand or right hand) of the worker as objects corresponding to nouns in the video. FIG. 3 shows an example of extracting verbs "hold" and "rotate" from the text in the item 3 of the work procedure manual and displaying a corresponding verb in the vicinity of the body part executing the action corresponding to the verb in the video.

Figure 4:
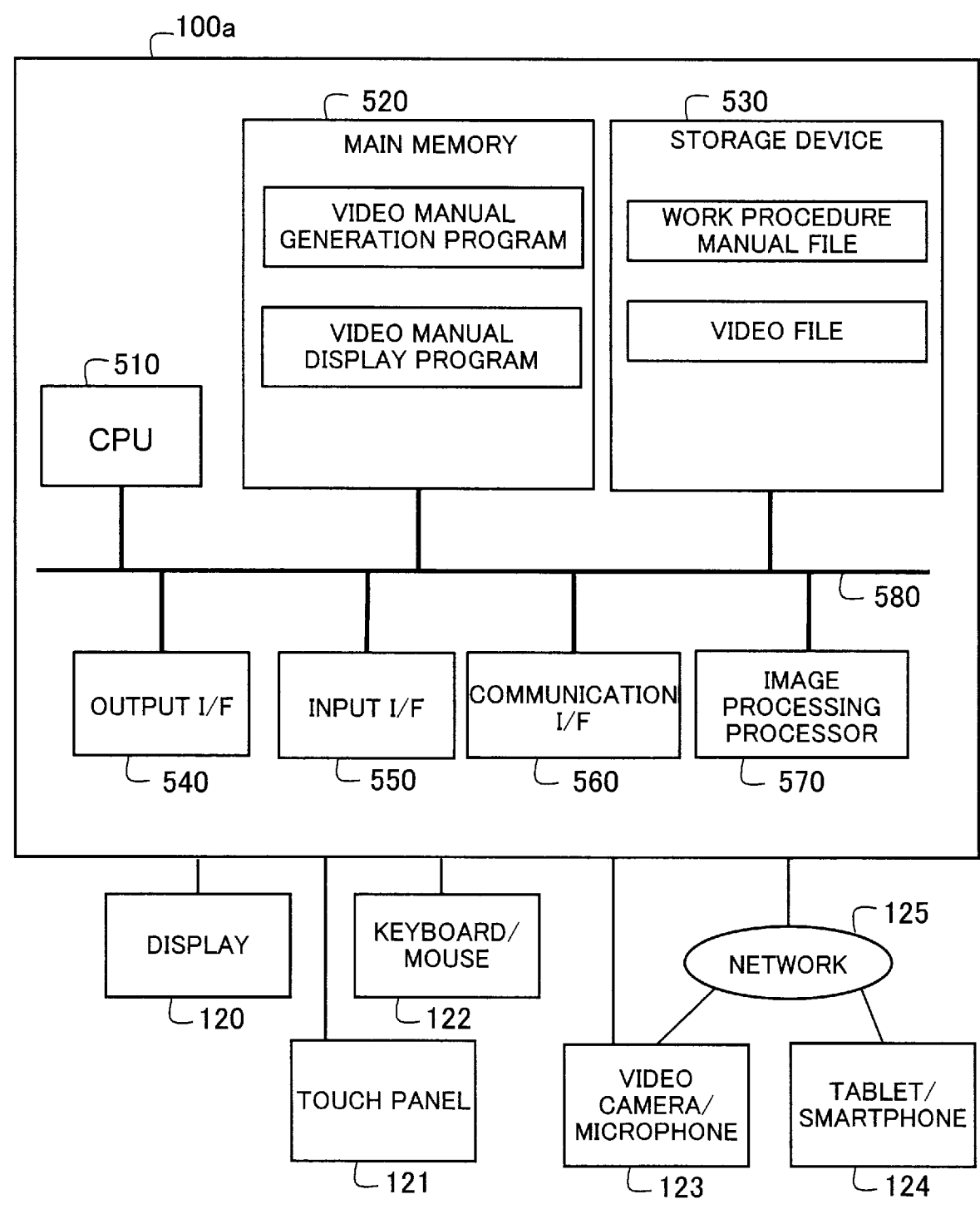
FIG. 4 is a diagram showing an example of the hardware configuration of a system (e.g., computer) implementing the video manual generation device and a display control device according to the first embodiment.

FIG. 4 is a diagram showing an example of the hardware configuration of a computer as a system implementing the video manual generation device 100 and the display control device 110. As shown in FIG. 4, the computer includes a CPU (Central Processing Unit) 510 as a processor for processing information, a main memory 520 such as a RAM (Random Access Memory), a storage device 530 such as a hard disk drive (HDD) or a solid state drive (SSD), an output interface (I/F) 540, an input I/F 550, a communication I/F 560, and an image processing processor 570. The display

120, a touch panel 121, a keyboard/mouse 122, a video camera/microphone 123, a network 125 and a tablet/smartphone 124 are connected to the computer.

Functions of the video manual generation device 100 and the display control device 110 may be implemented by processing circuitry. The processing circuitry can be either dedicated hardware or a processor that executes a program (e.g., a video manual generation program, a display control program or the like) stored in the main memory. The video manual generation program is installed from a program stored in a record medium (i.e., storage medium) or by the downloading via the Internet. The storage medium is a non-transitory computer-readable storage medium storing a program such as the video manual generation program.

It is also possible to implement part of the functions of the video manual generation device 100 and the display control device 110 by dedicated hardware and implement part of the functions by software or firmware. As above, the processing circuitry is capable of implementing the functions of the functional blocks shown in FIG. 1 by hardware, software, firmware or a combination of some of these means.

Figure 5:
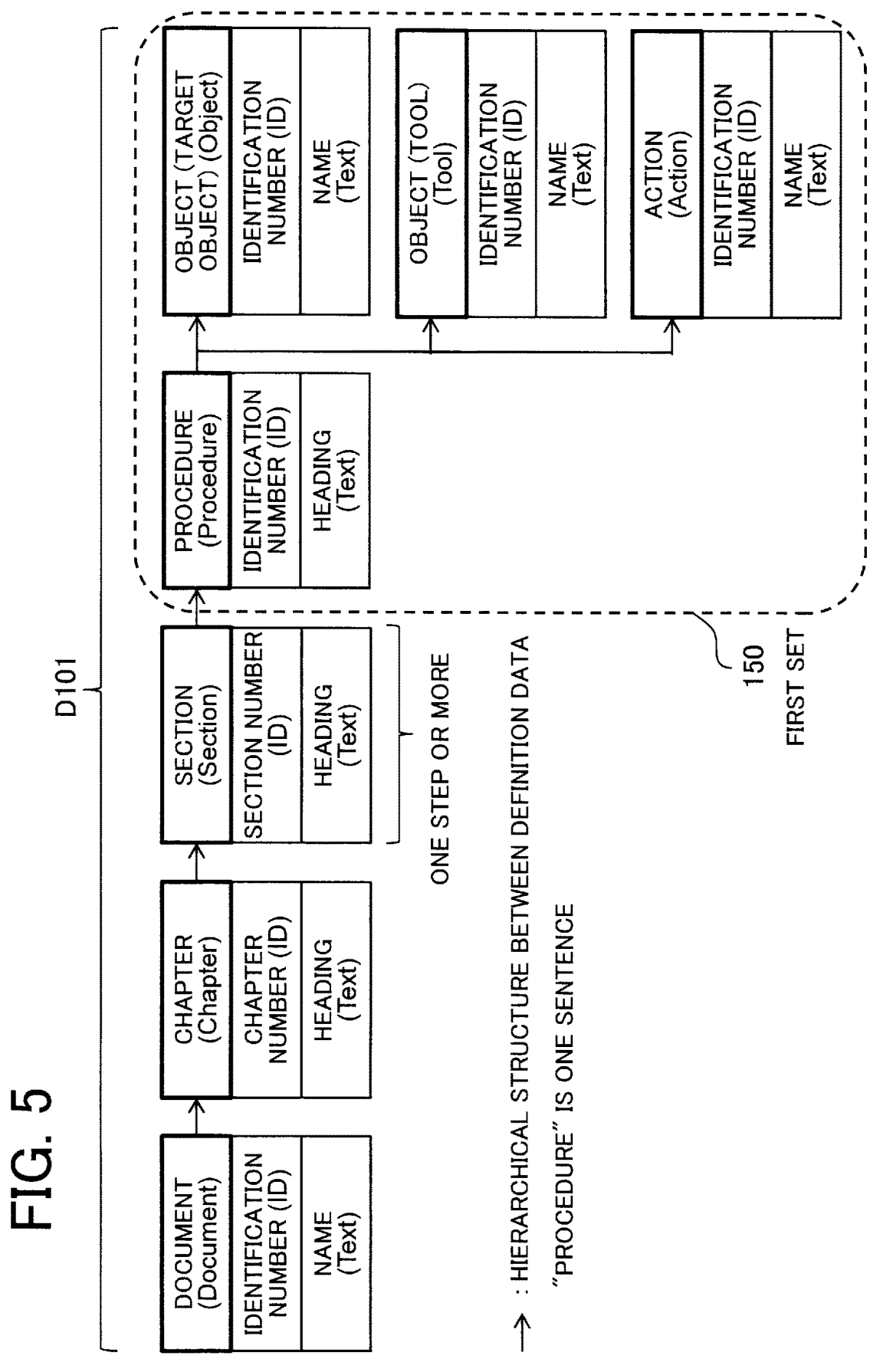
FIG. 5 is a diagram showing a configuration example of text information data generated by a document analysis unit.

FIG. 5 is a diagram showing a configuration example of the text information data D101 generated by the document analysis unit 101. In FIG. 5, each arrow indicates a hierarchical structure between definition data, and the tip of each arrow is pointing towards a layer at a lower level. Further, in FIG. 5, the "procedure" represents one sentence. FIG. 5 shows an example in which the text information data D101 is formed with one or more "documents", each "document" is formed with one or more "chapters", each "chapter" is formed with one or more "sections", each "section" is formed with one or more "procedures" as sentences, and each "procedure" is formed with a "target object" and a "tool" as "objects" and an "action".

Figure 6:
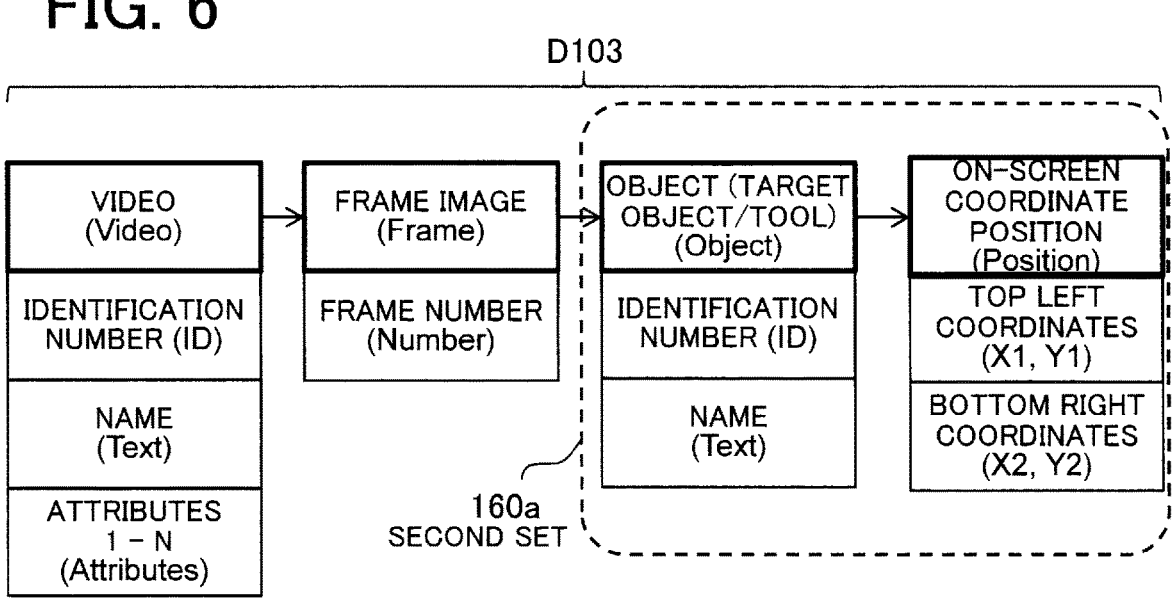
FIG. 6 is a diagram showing a configuration example of object information data generated by an object detection unit of a video analysis unit.

FIG. 6 is a diagram showing a configuration example of the object information data D103 generated by the object detection unit 103 of the video analysis unit 102. The object information data D103 in FIG. 6 shows an example in which each "video" is formed with one or more "frame images", each "frame image" includes one or more "objects (target objects/tools)", and each "object" is formed with one or more coordinate sets each representing an "on-screen coordinate position". Further, it is also possible to indicate a playback time of the video from its front end by multiplying the inverse of a frame rate value by the frame number.

Figure 7:
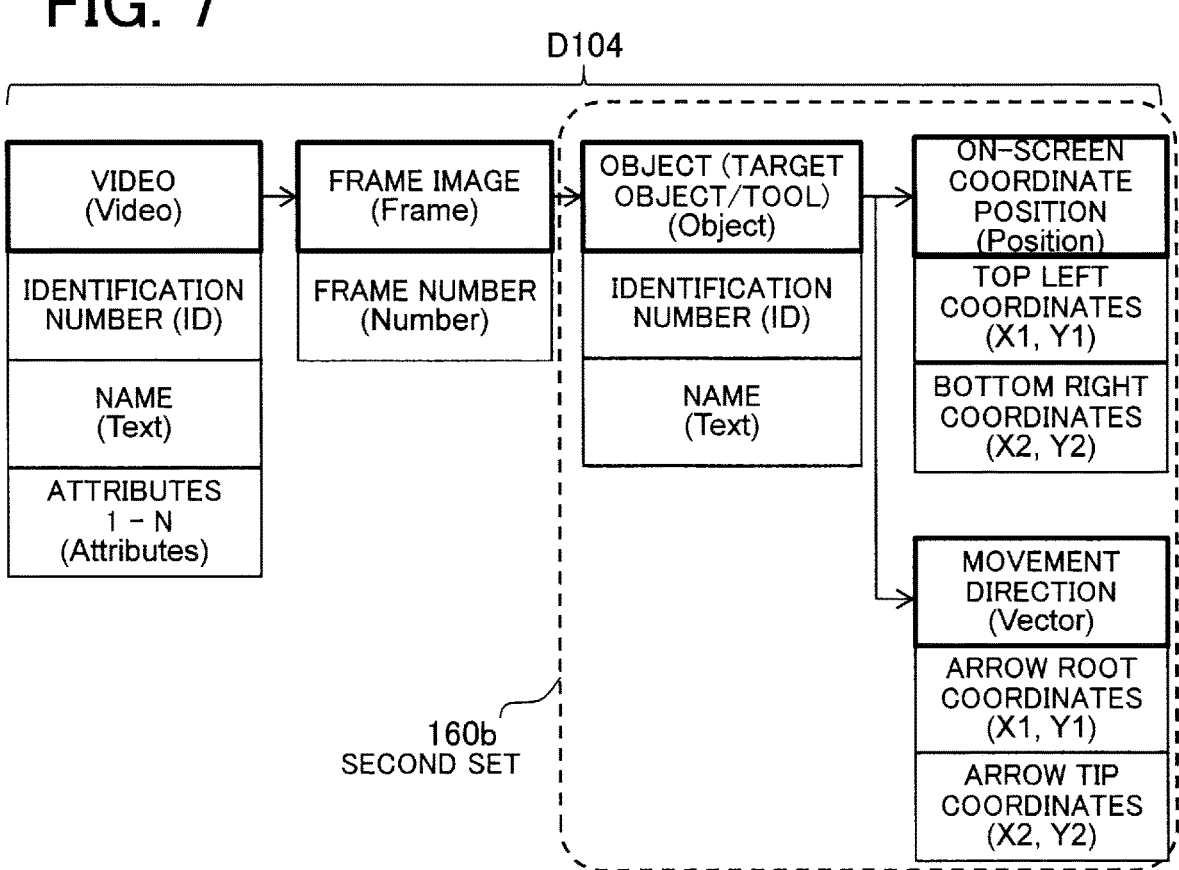
FIG. 7 is a diagram showing a configuration example of action information data generated by an action detection unit of the video analysis unit.

FIG. 7 is a diagram showing a configuration example of the action information data D104 generated by the action detection unit 104 of the video analysis unit 102. The action information data D104 in FIG. 7 shows an example in which each "video" is formed with one or more "frame images", each "frame image" includes one or more "objects (target objects/tools)", and each "object" is formed with one or more coordinate sets each representing an "on-screen coordinate position" and an arrow root coordinate set (i.e., coordinates of the rear end of the arrow) and an arrow tip coordinate set (i.e., coordinates of the front end of the arrow) representing a "movement direction".

Figure 8:
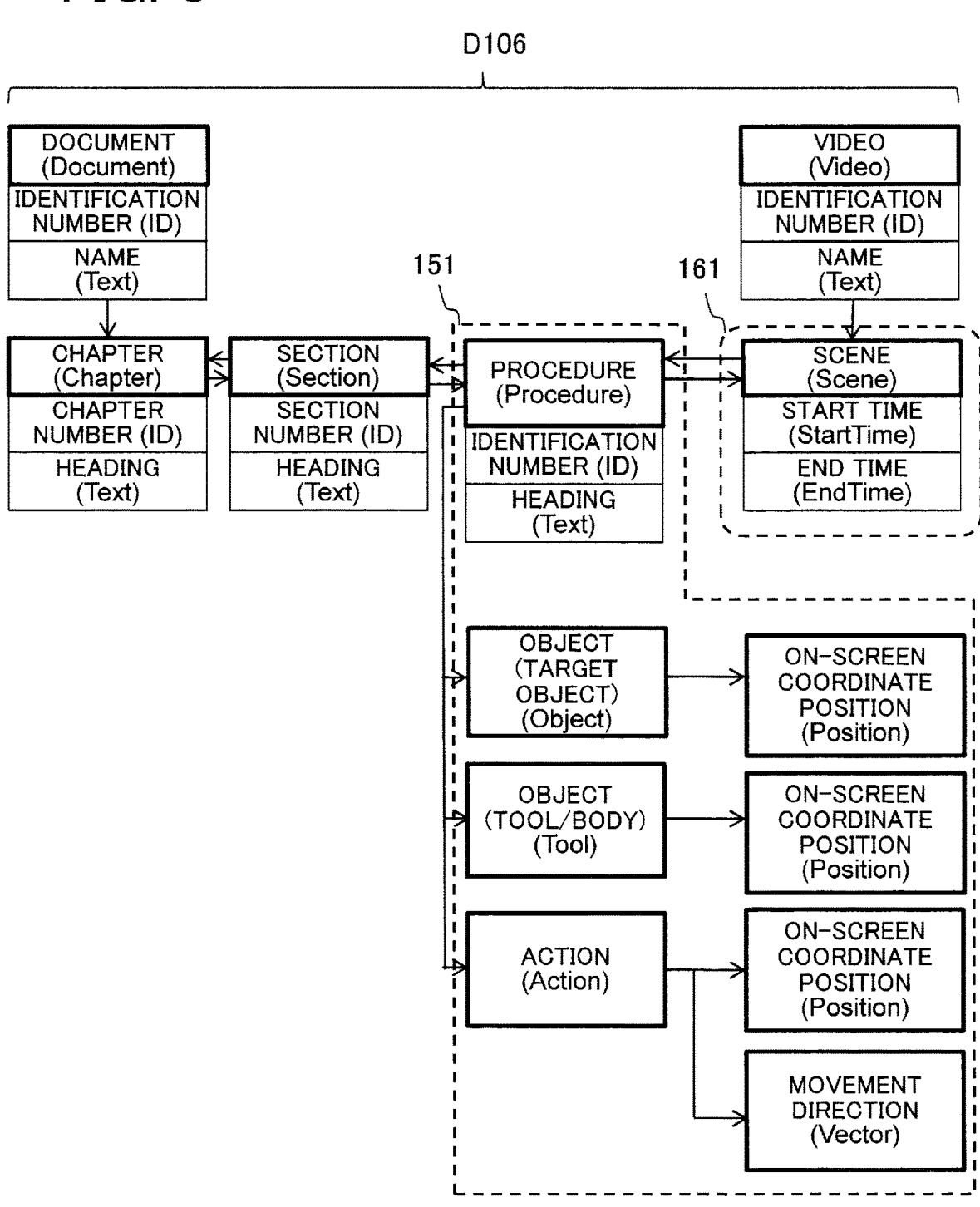
FIG. 8 is a diagram showing a configuration example of link information data generated by a link information generation unit.

FIG. 8 is a diagram showing a configuration example of the link information data D106 generated by the link information generation unit 106. The link information data D106 in FIG. 8 is formed with the text information data D101 in FIG. 5, the object information data D103 in FIG. 6 and the action information data D104 in FIG. 7. The link information data D106 in FIG. 8 shows an example in which each "procedure" is formed with an "object (target object)", an "object (tool or body part)" and an "action".

FIG. 9 is a flowchart showing a generation process of the text information data D101 executed by the document analysis unit 101. First, the document analysis unit 101 reads in the work procedure manual file as a document file (step S101) and judges whether or not chapter section numbers (i.e., a chapter number and a section number) at the position of the text read in are final chapter section numbers in the work procedure manual (step S102). If the chapter section numbers are the final chapter section numbers (YES in the step S102), the document analysis unit 101 ends the generation process of the text information data D101. If the chapter section numbers are not the final chapter section numbers (NO in the step S102), the document analysis unit 101 generates a node based on a hierarchical tree of chapter numbers and section numbers (shown in FIG. 10 which will be explained later) (step S103).

The document analysis unit 101 judges whether the "procedure" is the final "procedure" (i.e., sentence or text) or not (step S104), and if the "procedure" is the final "procedure" (YES in the step S104), returns the process to the step S102. If the "procedure" is not the final "procedure" (NO in the step S104), the document analysis unit 101 cuts out a "procedure" at the section number (step S105).

The document analysis unit 101 cuts out a word by means of morphological analysis and identifies the word category (part of speech) of the word (step S106). The document analysis unit 101 executes parsing by using a dictionary, and generates a node for each target object (noun) as an object, each tool (noun) as an object, and each action (verb) (step S107). The document analysis unit 101 repeatedly executes the processing of the steps S104 to S107 until the final "procedure".

Figure 10:
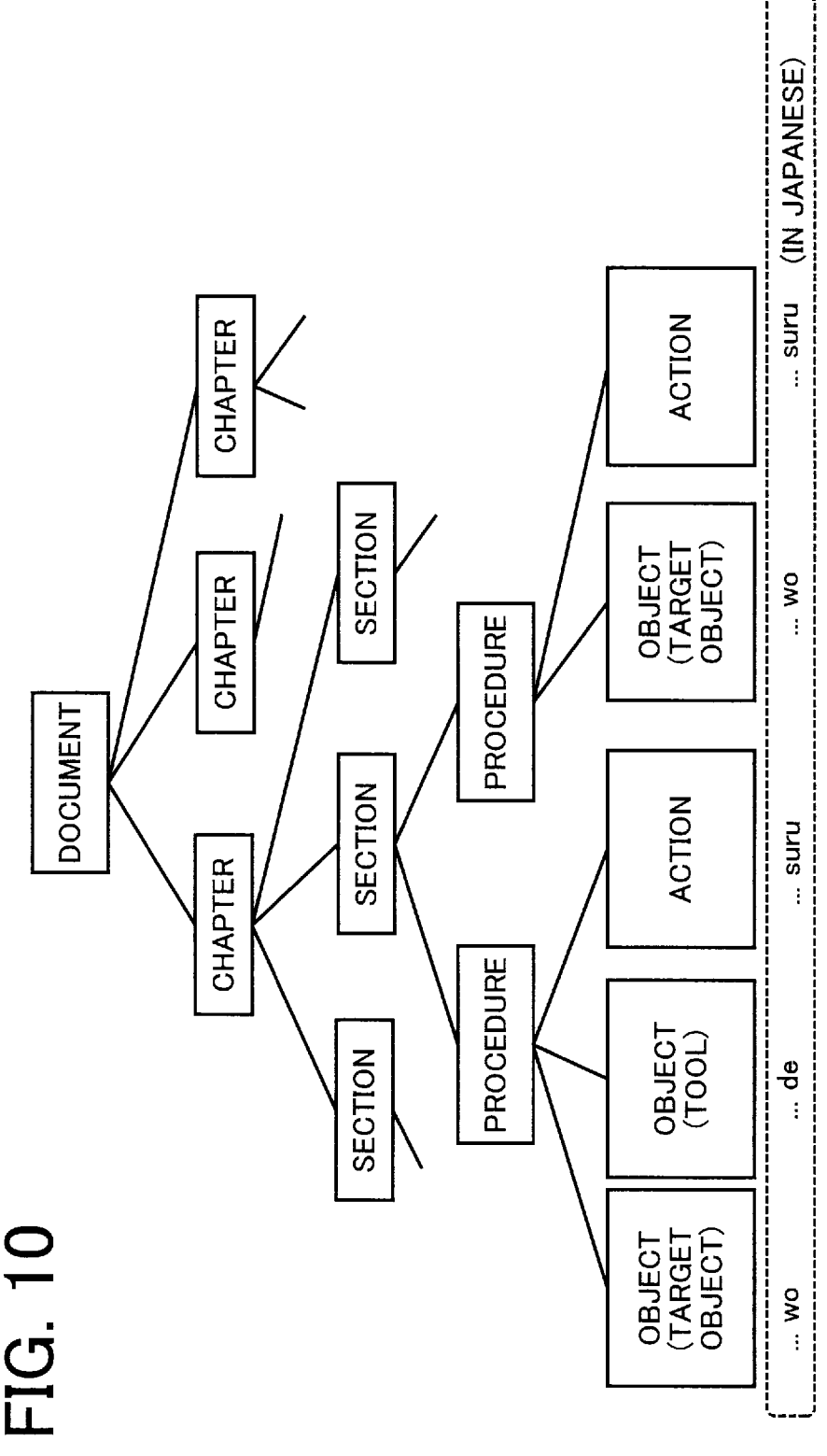
FIG. 10 is a diagram showing an example of a tree structure of the text information data generated by the document analysis unit.

FIG. 10 is a diagram showing an example of a tree structure of the text information data D101 generated by the document analysis unit 101. As shown in FIG. 10, a "document" is formed with one or more "chapters" as nodes, each "chapter" is formed with one or more "sections" as nodes, each "section" is formed with one or more "procedures" (sentences or texts) as nodes, and each "procedure" is formed with one or more "objects" as nodes and one or more "actions" as nodes.

Figure 11:
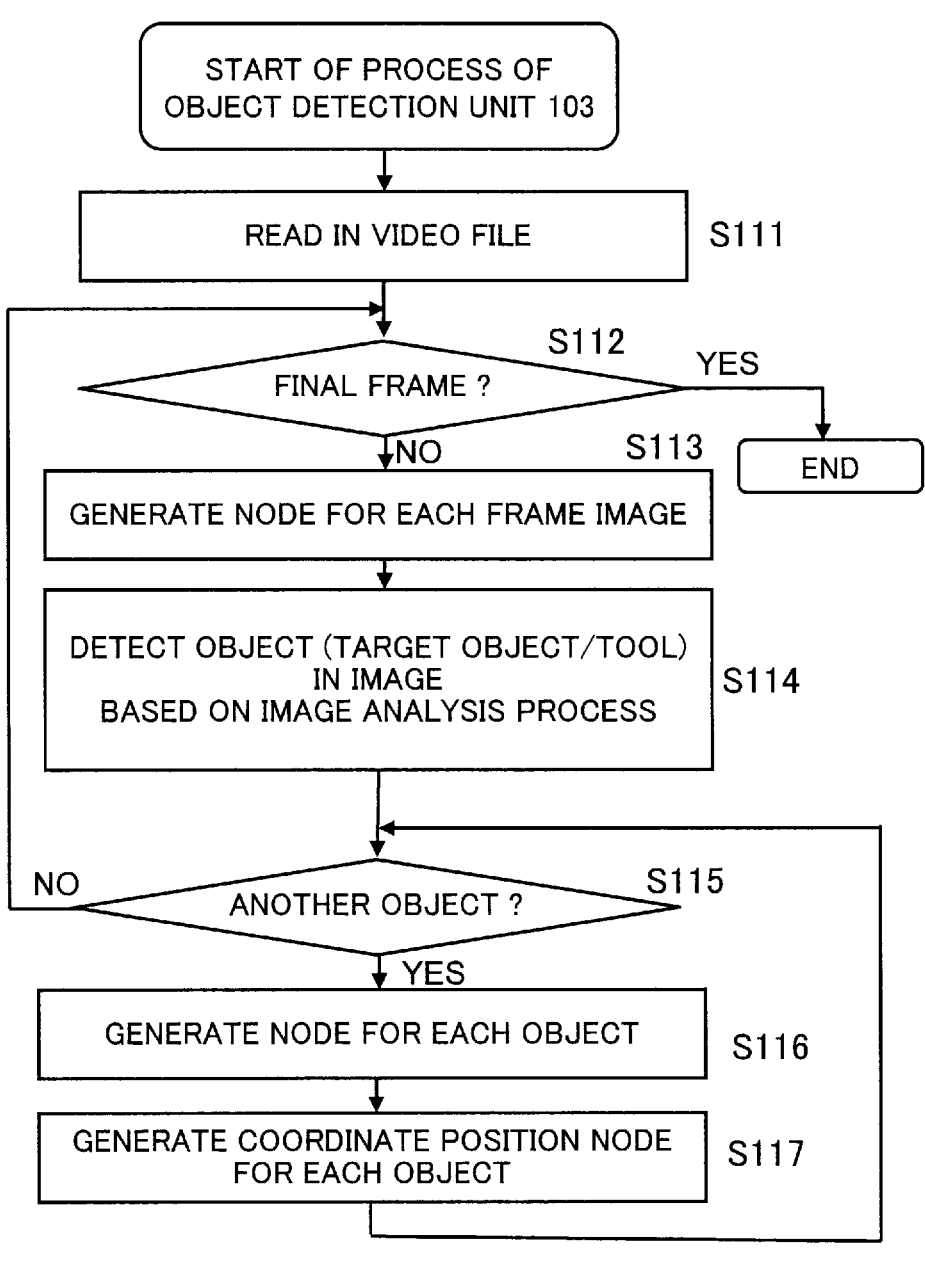
FIG. 11 is a flowchart showing a generation process of the object information data executed by the object detection unit of the video analysis unit.

FIG. 11 is a flowchart showing a generation process of the object information data D103 executed by the object detection unit 103 of the video analysis unit 102. First, the object detection unit 103 reads in a video file (i.e., image file) obtained by camera recording (step S111) and judges whether or not the read-in frame image of the video file is at a frame number of the final frame image (step S112). If the frame image read in is at the final frame number (YES in the step S112), the object detection unit 103 ends the generation process of the object information data D103. If the frame image read in is not at the final frame number (NO in the step S112), the object detection unit 103 generates a node (shown in FIG. 12 which will be explained later) for each frame image (step S113).

Subsequently, the object detection unit 103 detects an object (e.g., a target object, a tool or a body part) in the image based on an image analysis process. The object detection unit 103 judges whether or not there exists another object as an undetected object (step S115), and if there exists no other object (NO in the step S115), returns the process to the step S112. If there exists another object (YES in the step S115), the object detection unit 103 generates a node (shown in FIG. 12 which will be explained later) for each object (step S116) and generates a coordinate position node (shown in FIG. 12 which will be explained later) for each object (step S117).

Figure 12:
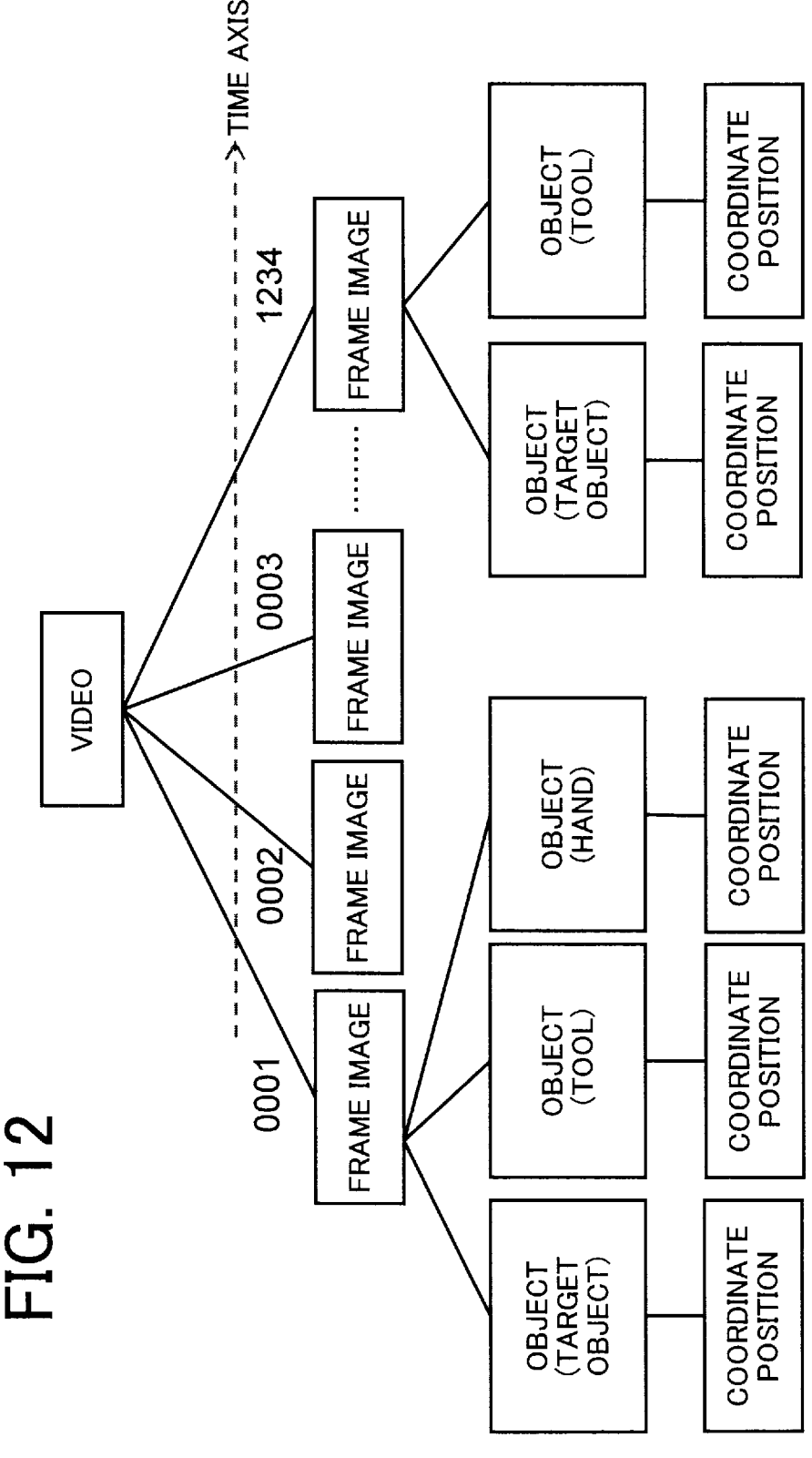
FIG. 12 is a diagram showing an example of a tree structure of the object information data generated by the object detection unit of the video analysis unit.

FIG. 12 is a diagram showing an example of a tree structure of the object information data D103 generated by the object detection unit 103. As shown in FIG. 12, the "video" is formed with one or more "frame images" (frame numbers 0001-1234) as nodes, each "frame image" is formed with one or more "objects" as nodes, and each "object" is formed with one or more "coordinate positions" as nodes.

Figure 13:
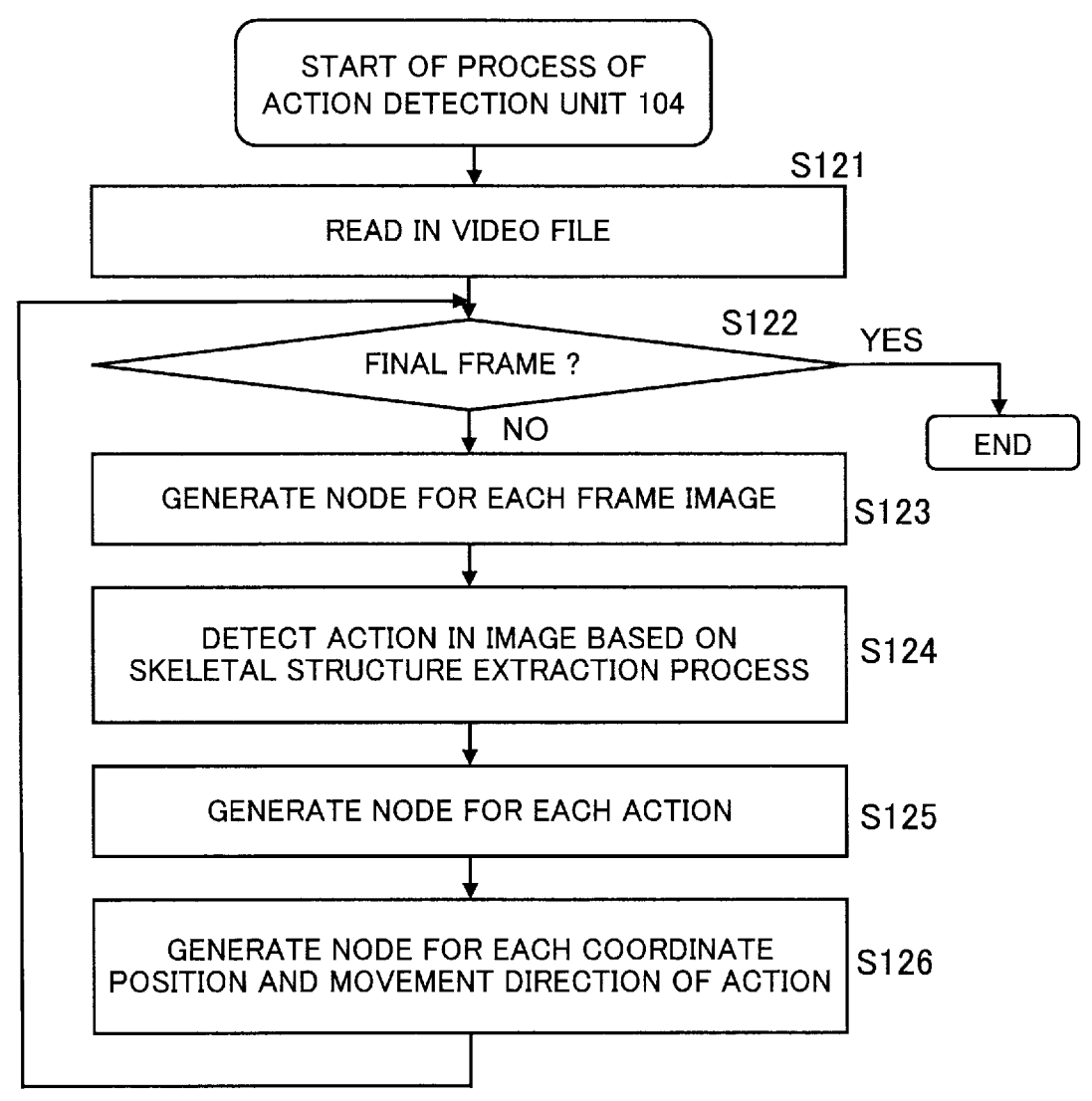
FIG. 13 is a flowchart showing a generation process of the action information data executed by the action detection unit of the video analysis unit.

FIG. 13 is a flowchart showing a generation process of the action information data D104 executed by the action detection unit 104. First, the action detection unit 104 reads in a video file (step S121) and judges whether or not the read-in frame image of the video file is at the frame number of the final frame image (step S122). If the frame image read in is at the final frame number (YES in the step S122), the action detection unit 104 ends the generation process of the action information data. D104. If the frame image read in is not at the final frame number (NO in the step S122), the action detection unit 104 generates a node (shown in FIG. 14 which will be explained later) for each frame image (step S123).

Subsequently, the action detection unit 104 detects an action (e.g., a hand action) in the image based on a skeletal structure extraction process (step S124). Subsequently, the action detection unit 104 generates a node (shown in FIG. 14 which will be explained later) for each action (step S125) and generates a node (shown in FIG. 14 which will be explained later) for each coordinate position and movement direction of the action (step S126).

Figure 14:
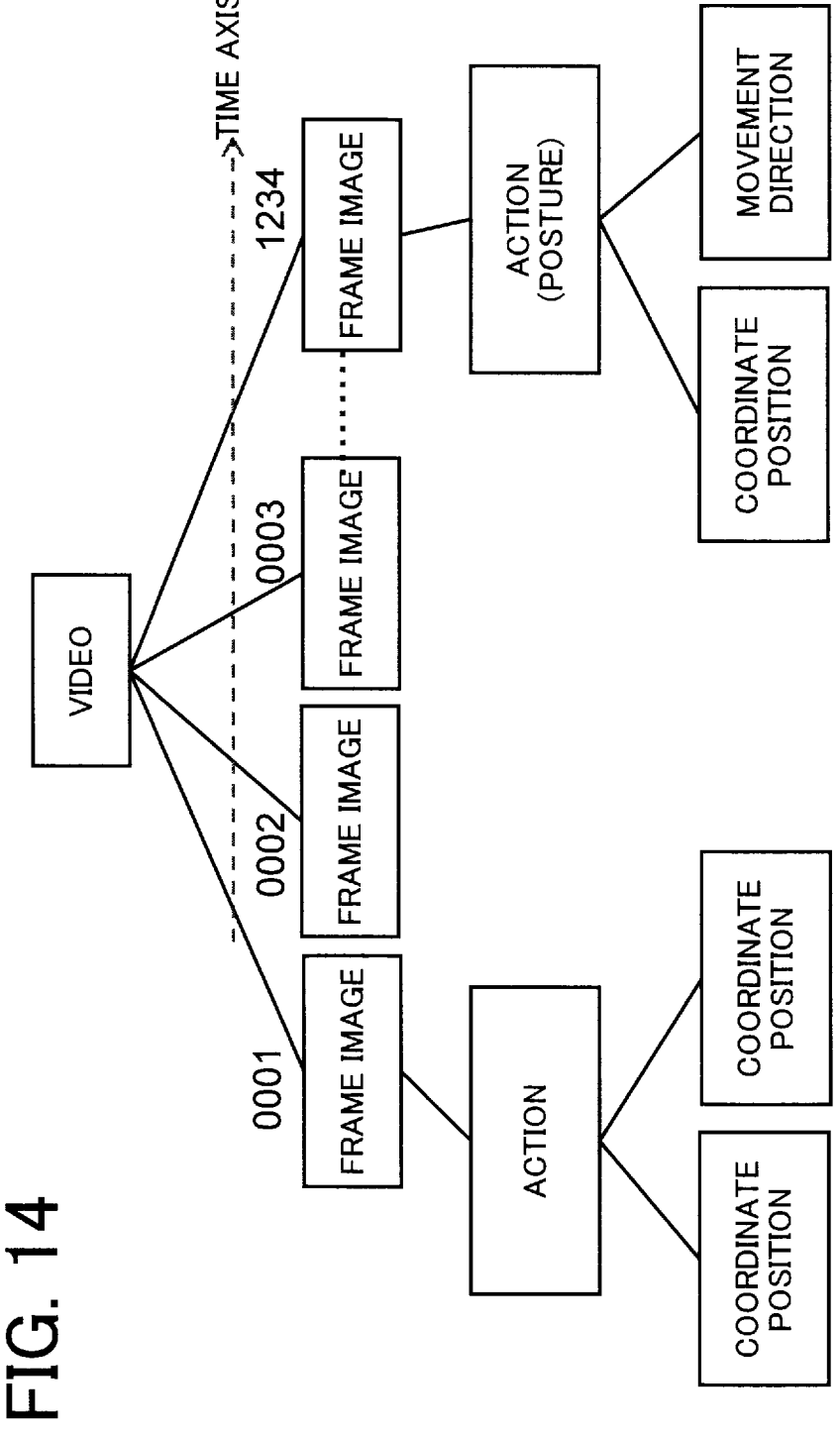
FIG. 14 is a diagram showing an example of a tree structure of the action information data generated by the action detection unit of the video analysis unit.

FIG. 14 is a diagram showing an example of a tree structure of the action information data D104 generated by the action detection unit 104. As shown in FIG. 14, the "video" is formed with one or more "frame images" (frame numbers 0001-1234) as nodes, each "frame image" is formed with one or more "actions" (which can include postures) as nodes, and each "action" is formed with one or more "coordinate positions"/"movement directions" as nodes.

Figure 15:
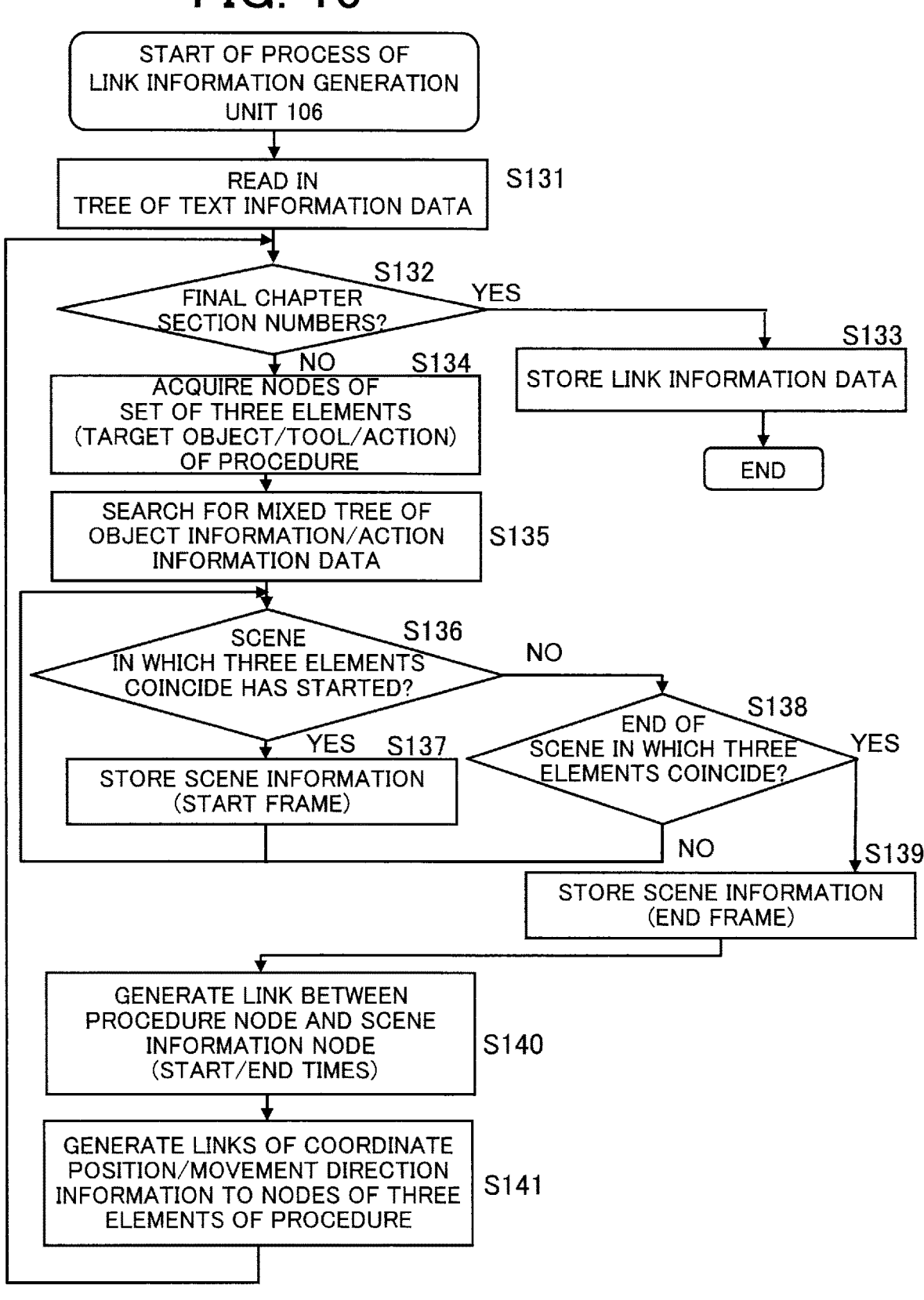
FIG. 15 is a flowchart showing a generation process of the link information data executed by the link information generation unit.

FIG. 15 is a flowchart showing a generation process of the link information data D106 executed by the link information generation unit 106. First, the link information generation unit 106 reads in the tree of the text information data D101 (see FIG. 10, for example) (step S131) and judges whether or not the read-in tree structure of the text information data D101 is regarding the final chapter section numbers (i.e., chapter number and section number) (step S132). If the tree structure read in is regarding the final chapter section numbers (YES in the step S132), the link information generation unit 106 stores the link information data D106 in the storage device 530 (step S133) and ends the generation process of the link information data D106. If the tree structure read in is not regarding the final chapter section numbers (NO in the step S132), the link information generation unit 106 acquires nodes of a set of three elements (a target object as an object, a tool as an object, and an action of a person) of the "procedure" (step S134).

Subsequently, the link information generation unit 106 searches for a mixed tree of the object information/action information data made up of the tree of the object information data D103 (see FIG. 12, for example) and the tree of the action information data D104 (see FIG. 14, for example) (step S135) and judges whether or not a scene in which the three elements coincide has started (step S136). If a scene in which the three elements coincide has started (YES in the step S136), the link information generation unit 106 stores scene information on the started scene (step S137) and returns the process to the step S136. If there is no scene in which the three elements coincide (NO in the step S136), the link information generation unit 106 judges whether or not there exists an end scene of the scene in which the three elements coincide (step S138).

In the judgment whether or not there exists an end scene of the scene in which the three elements coincide (step S138), if there exists an end scene (YES in the step S138), the link information generation unit 106 stores scene information regarding an end frame (step S139).

Subsequently, the link information generation unit 106 generates a link between the "procedure" node and a scene information node (a start time and an end time of the scene) (step S140). The link information generation unit 106 generates links of coordinate positions and movement direction information to the nodes of the three elements of the "procedure" (step S141).

Figure 16:
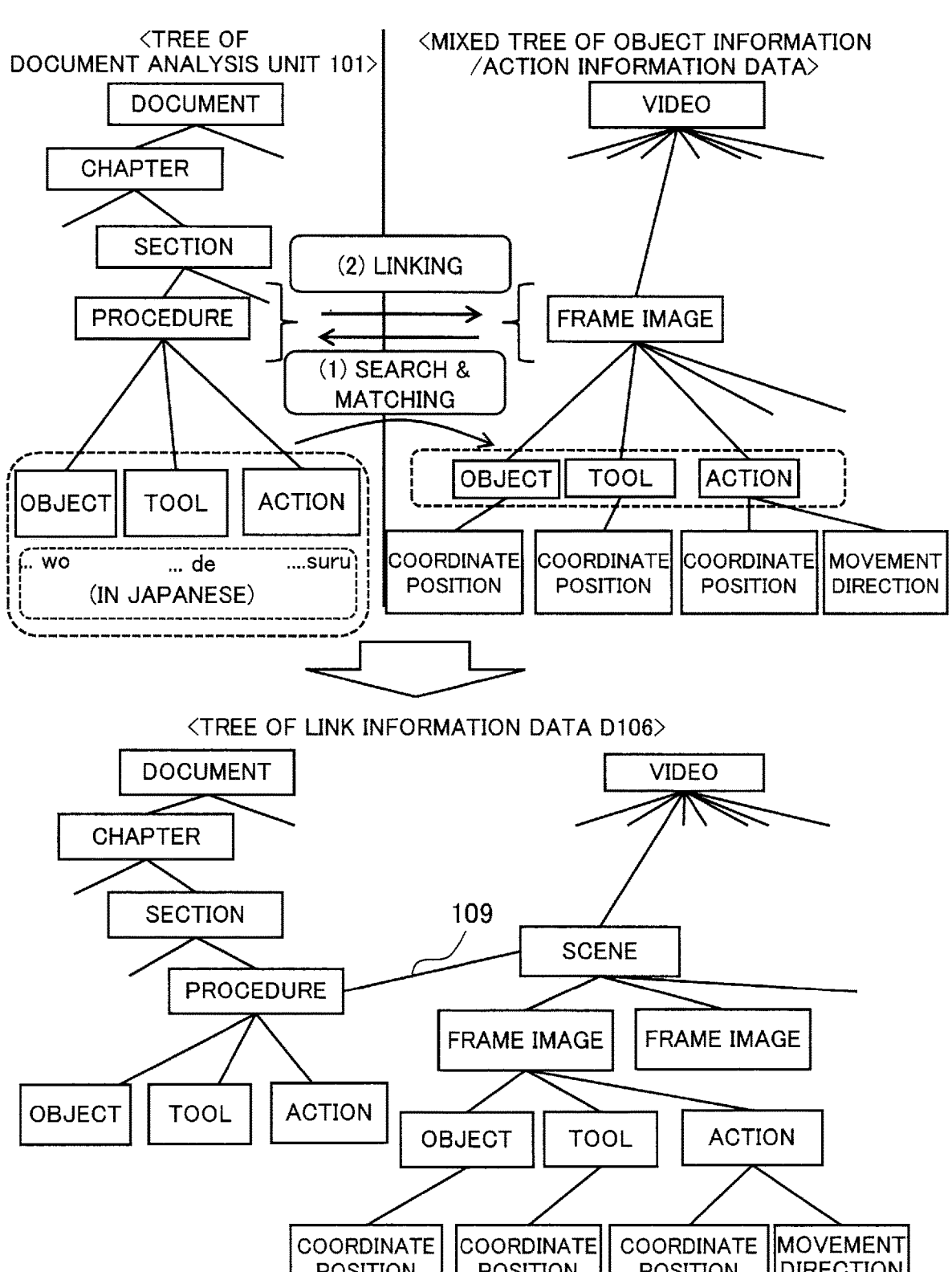
FIG. 16 is a diagram showing a generation process of a tree structure of the link information data executed by the link information generation unit.

FIG. 16 is a diagram showing a generation process of a tree structure of the link information data D106 executed by the link information generation unit 106. FIG. 16 indicates that the link information generation unit 106 forms the tree of the link information data D106 by linking a "procedure" in the tree of the text information data D101 with frame images in the mixed tree of the object information/action information data.

FIG. 17 is a flowchart showing a generation process of the video manual executed by the video manual generation unit 107. The video manual generation unit 107 reads in the work procedure manual file (step S151), reads in the link information data D106 (step S152), and judges whether or not the chapter section numbers of the work procedure manual file read in are the final chapter section numbers (step S153). If the chapter section numbers are the final chapter section numbers (YES in the step S153), the video manual generation unit 107 ends the generation process of the video manual data D107. If the chapter section numbers are not the final chapter section numbers (NO in the step S153), the video manual generation unit 107 identifies a text position of the chapter section numbers in the work procedure manual (step S154).

Subsequently, the video manual generation unit 107 acquires scene information (e.g., playback start time) corresponding to the chapter section numbers in the link information data, and generates a link of the scene information to the text position of the chapter section numbers (e.g., embeds a link code).

FIG. 18 is a flowchart showing a video manual display process executed by the display control device 110. First, the display control device 110 receives designation of the chapter section numbers (e.g., mouse clicking by the user) on a work procedure manual screen of the video manual data D107 (step S161). Subsequently, the display control device 110 jumps to a playback start position on a work video screen by executing the link code (step S162).

Subsequently, the display control device 110 reads in one frame of image from the video (step S163). The display control device 110 judges whether or not the playback position is a playback end position (step S164), and if the playback position is the playback end position (YES in the step S164), stops the playback of the video (step S169).

If the playback position is not the playback end position (NO in the step S164), the display control device 110 receives designation of a target object or a tool as an object and an action in the "procedure" (clicking) on the work procedure manual screen (step S165).

Subsequently, the display control device 110 refers to a link information table and acquires the coordinate position and the movement direction information regarding the designated item (step S166). Subsequently, the display control device 110 superimposes an emphasis mark on a desired position in the present image frame (step S167). Subsequently, the display control device 110 plays back and displays the video with the emphasis mark superimposed on the desired position in the present image frame (step S168).

As described above, in associating a "procedure" in a chapter/section of the work procedure manual with a corresponding scene in the work video (e.g., with a time of day), the video manual generation device 100 according to the first embodiment searches for and matches a plurality of pieces of data between which a set of at least two or more types of information among a target object as an object, a tool as an object, and an action of a person coincides with each other. Therefore, the rate of incidence of a matching error can be reduced.

Further, in the video manual generation device 100 according to the first embodiment, a "procedure" in a "chapter/section" in the work procedure manual and a corresponding scene in the video are linked (associated) with each other via the link information data D106 so as to be uniquely identified, and thus when the worker designates a "procedure" (one sentence in the text) or a part regarding an object (" . . . wo", which is a postpositional particle in Japanese and indicates that " . . . " is a direct object or the like), a tool (" . . . de", which is a postpositional particle in Japanese and indicates "by using . . . ") or an action (" . . . suru", which is used as a verb or a part of a verb in Japanese) described in a "procedure" in a "chapter/section" in the work procedure manual by means of mouse clicking or the like, an emphasis display (displaying a frame, coloring, blinking, superimposition of an arrow, or the like) indicating a target object (material, component or the like) as a designated object, a tool (implement, right hand or the like) as a designated object, or an action (direction, level) can be executed individually on the image of the corresponding scene in the work video immediately in conjunction with the designation by the worker.

Furthermore, in the video manual generation device 100 according to the first embodiment, a "procedure" in a "chapter/section" in the work procedure manual and a corresponding scene in the work video are bidirectionally linked (associated) with each other via the "link information data" so as to be uniquely identified, and thus at the time point when the scene is identified by pausing the playback of the work video or the like, the scene identifies the "procedure" part in the "chapter/section" in the work procedure manual, and screen transition and the emphasis display can be executed automatically.

Moreover, in the first embodiment, the object detection unit 103 and the action detection unit 104 are configured to detect and store object information in each image and action information on the worker based on the time axis of the work video in the object information data D103 and the action information data D104. Therefore, it is possible to search for a scene of desired work through character input or voice input of keywords indicating a target object as an object relevant to the contents of the work, a tool as an object, and an action of a person. Further, as a result, a jump to a desired scene in the video and the playback from the desired scene can be executed easily and precisely.

Second Embodiment

FIG. 19 is a functional block diagram schematically showing the configuration of a video manual generation device 200 according to a second embodiment. In FIG. 19, each component identical or corresponding to a component shown in FIG. 1 is assigned the same reference character as in FIG. 1. The video manual generation device 200 is a device capable of executing a video manual generation method according to the second embodiment. The video manual generation device 200 differs from the video manual generation device 100 according to the first embodiment in that a video analysis unit 202 includes a speech analysis unit 105 that analyzes speech in a video file and the link information generation unit 106 further uses speech information data D105. The video manual data D107 generated by the video manual generation device 200 is outputted to the display control device 110. The video manual generation device 200, the display control device 110 and the display 120 constitute a video manual presentation system that presents the video manual to a person (e.g., worker). Further, the display control device 110 can also be provided as a part of the video manual generation device 200.

Figure 20:
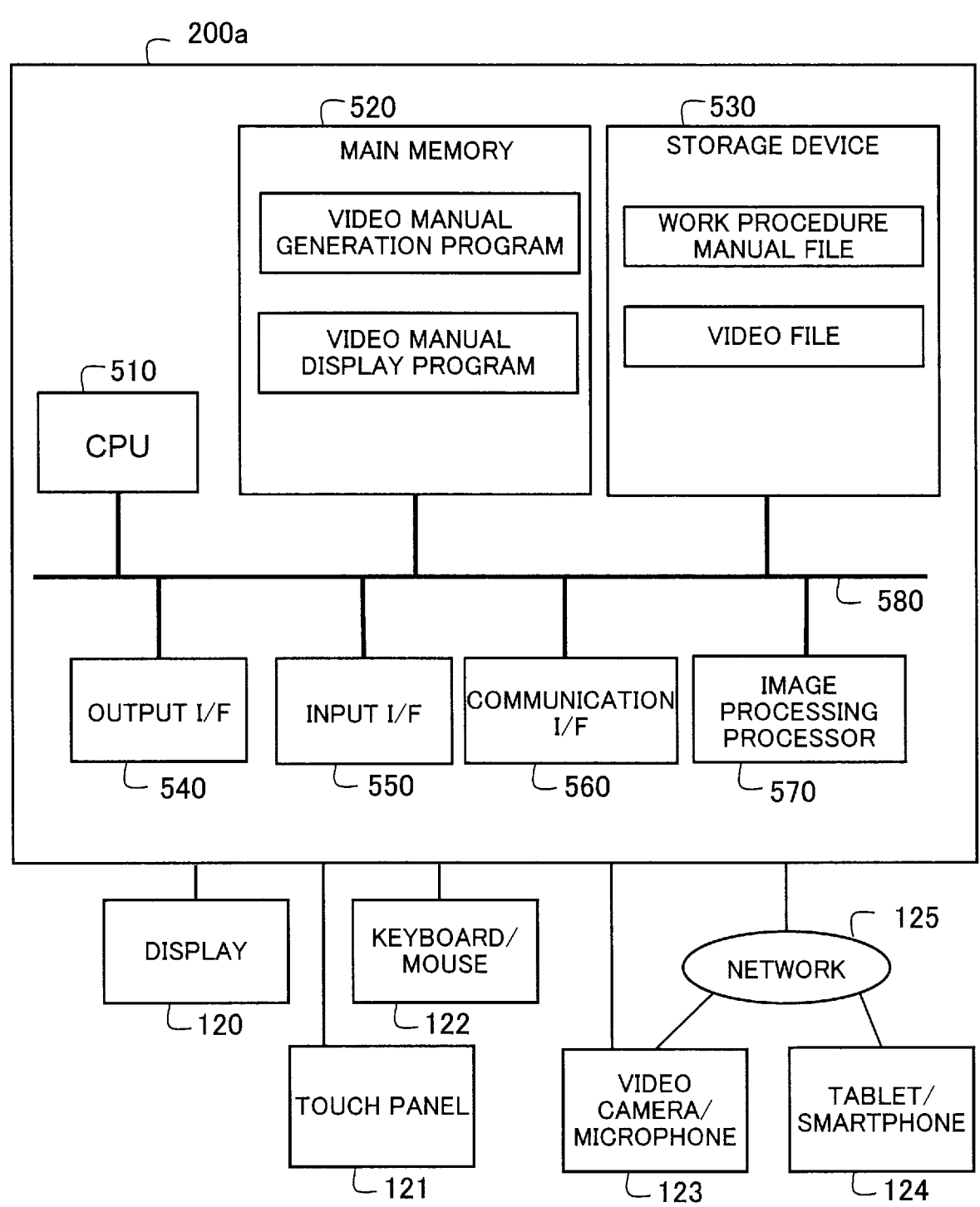
FIG. 20 is a diagram showing an example of the hardware configuration of a system (e.g., computer) implementing the video manual generation device and the display control device according to the second embodiment.

FIG. 20 is a diagram showing an example of the hardware configuration of a system (e.g., computer) 200a implementing the video manual generation device 200 and the display control device 110. In FIG. 20, each component identical or corresponding to a component shown in FIG. 4 is assigned the same reference character as in FIG. 4. The system 200a in FIG. 20 differs from the system 100a in FIG. 4 in that the speech in the video file is analyzed and the video manual is generated by using the speech information data D105.

Figure 21:
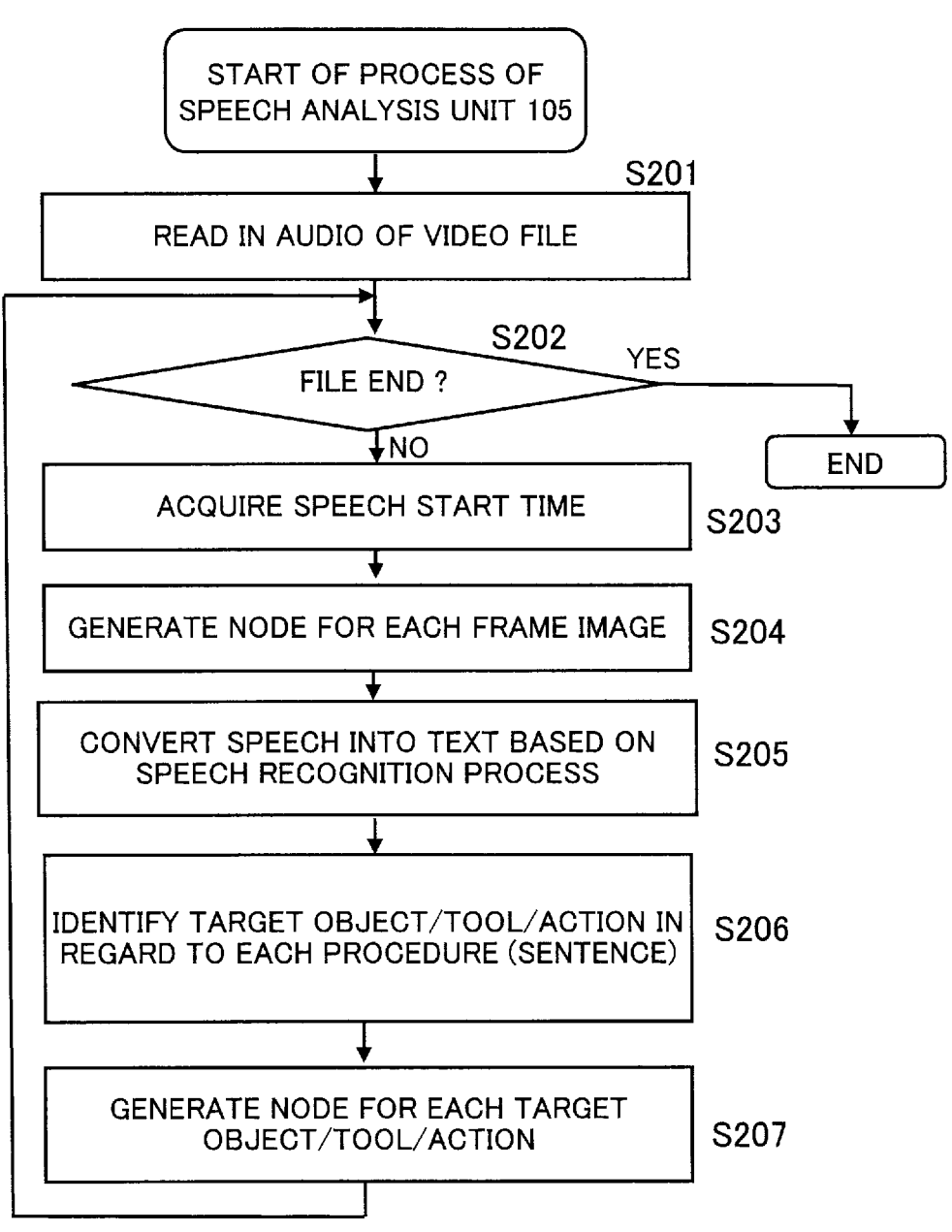
FIG. 21 is a flowchart showing a process executed by a speech analysis unit of the video manual generation device according to the second embodiment.

FIG. 21 is a flowchart showing a process executed by the speech analysis unit 105 of the video manual generation device 200. First, the speech analysis unit 105 reads in audio of the video file (step S201) and judges whether or not the read-in frame image of the video file is the final frame image (step S202). If the frame image read in is the final frame image (YES in the step S202), the speech analysis unit 105 ends the generation process of the speech information data D105. If the frame image read in is not at the final frame number (NO in the step S202), the speech analysis unit 105 acquires a speech start time (step S203) and generates a node (shown in FIG. 22 which will be explained later) for each frame image (step S204).

Subsequently, the speech analysis unit 105 converts the audio (speech) into text based on a speech recognition process (step S205). Subsequently, the speech analysis unit 105 identifies a target object (" . . . wo", which is a postpositional particle in Japanese and indicates that " . . . " is a direct object or the like) as an object, a tool (" . . . de", which is a postpositional particle in Japanese and indicates "by using . . . ") as an object, and an action (" . . . suru", which is used as a verb or a part of a verb in Japanese) in regard to each "procedure" sentence (step S206), and generates a node (shown in FIG. 22 which will be explained later) for each target object, tool and action (step S207).

Figure 22:
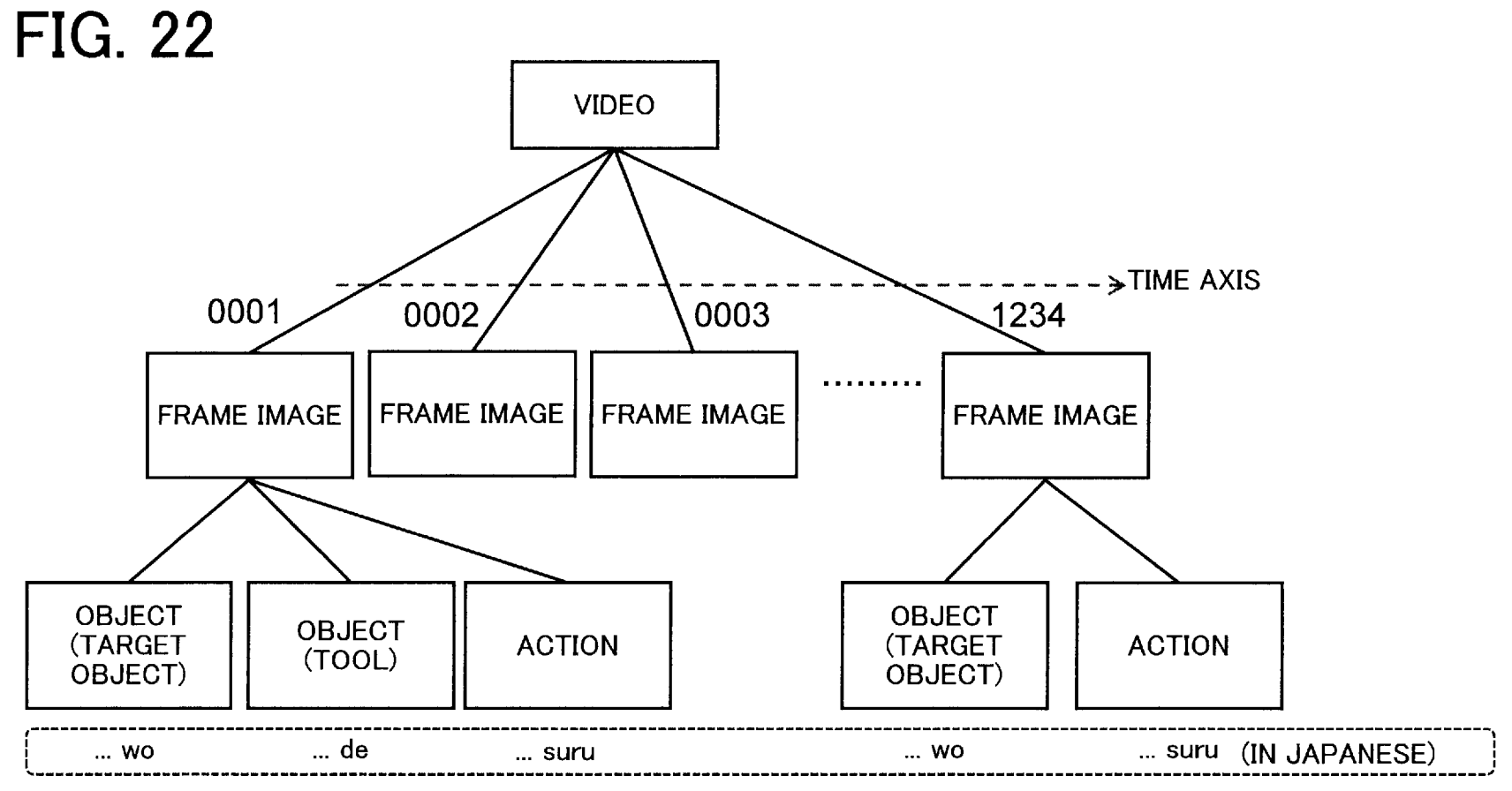

FIG. 22 is a diagram showing an example of a tree structure of the speech information data D105 generated by the speech analysis unit 105. As shown in FIG. 22, the "video" is formed with one or more "frame images" (e.g., frame numbers 0001-1234) as nodes, and each "frame image" is formed with one or more "objects (target objects)"/"objects (tools)"/"actions" as nodes.

Figure 23:
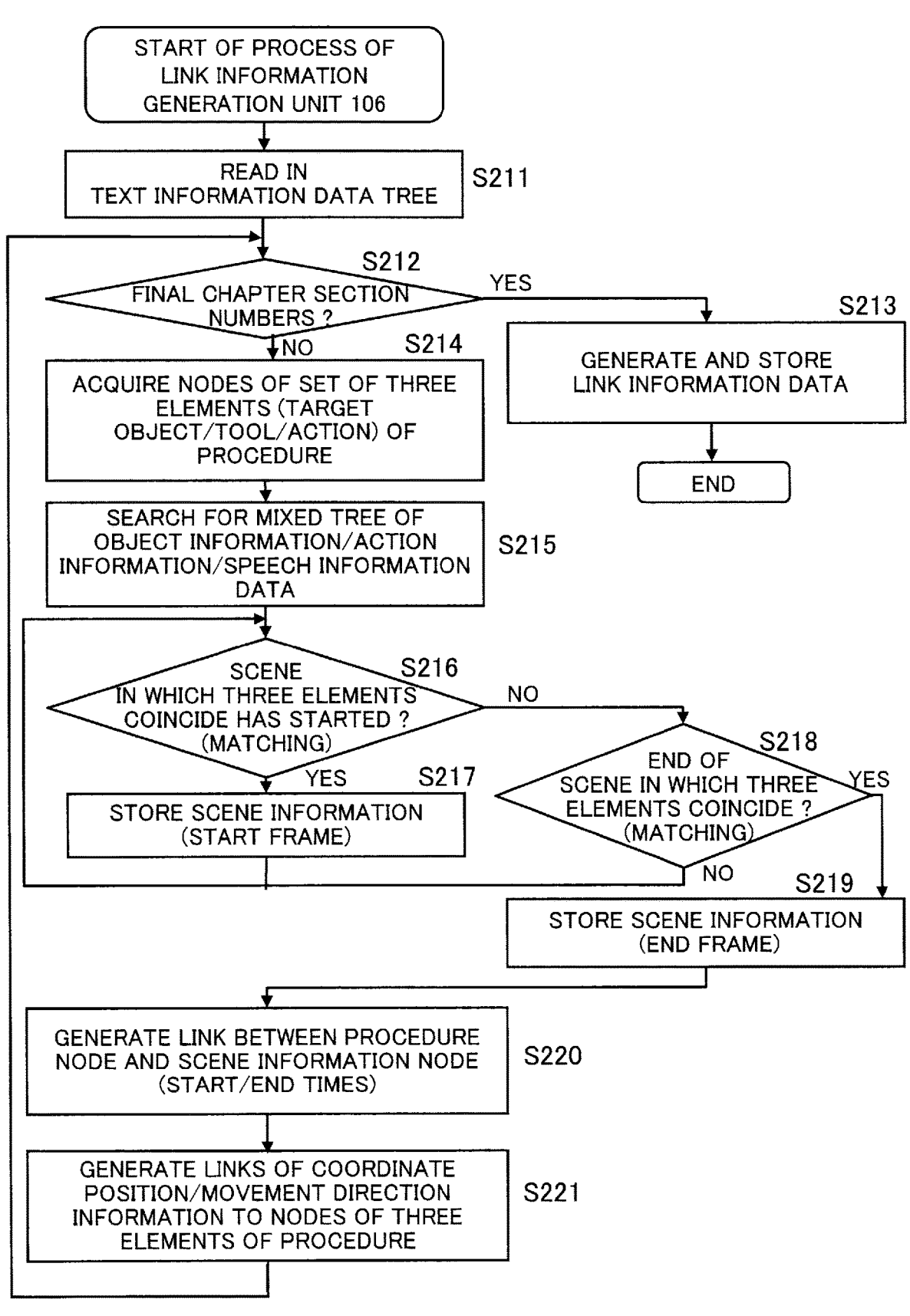
FIG. 23 is a flowchart showing a generation process of the link information data executed by the link information generation unit of the video manual generation device according to the second embodiment.

FIG. 23 is a flowchart showing a generation process of the link information data D106 executed by the link information generation unit 106 of the video manual generation device 200. First, the link information generation unit 106 reads in the tree of the text information data D101 (step S211) and judges whether or not the read-in tree structure of the text information data D101 is regarding the final chapter section numbers (i.e., chapter number and section number) (step S212). If the tree structure read in is regarding the final chapter section numbers (YES in the step S212), the link information generation unit 106 stores the link information data D106 in the storage device 530 (step S213) and ends the generation process of the link information data D106. If the tree structure read in is not regarding the final chapter section numbers (NO in the step S212), the link information generation unit 106 acquires nodes of a set of three elements (a target object as an object, a tool as an object, and an action of a person) of the "procedure" (step S214).

Subsequently, the link information generation unit 106 searches for a mixed tree of the object information/action information/speech information data made up of the tree of the object information data D103, the tree of the action information data D104 (see FIG. 14, for example) and the speech information data (step S215) and judges whether or not a scene in which the three elements coincide has started (step S216). If a scene in which the three elements coincide has started (YES in the step S216), the link information generation unit 106 stores the scene information on the started scene (step S217) and returns the process to the step S216. If there is no scene in which the three elements coincide (NO in the step S216), the link information generation unit 106 judges whether or not there exists an end scene of the scene in which the three elements coincide (step S218).

In the judgment whether or not there exists an end scene of the scene in which the three elements coincide (step S218), if there exists the end scene (YES in the step S218), the link information generation unit 106 stores the scene information regarding the end frame (step S219).

Subsequently, the link information generation unit 106 generates a link between the "procedure" node and the scene information node (the start time and the end time of the scene) (step S220). The link information generation unit 106 generates links of coordinate positions and movement direction information to the nodes of the three elements of the "procedure" (step S221).

As described above, the video manual generation device 200 according to the second embodiment is provided with the speech analysis unit 105, and the speech analysis unit 105 analyzes the speech in the video, extracts speech (e.g., speech regarding a target object and a tool as objects and an action of a person) in the video, and outputs the speech information data D105 structured under the time axis of the video. Therefore, in cases of a cooking video, for example, the worker can generate a video manual for cooking with audio commentary if the worker advances the work while speaking about the procedure of the work in the video.

Further, since the link information generation unit 106 associates the work procedure manual and the work video with each other by using the speech information data D105, the accuracy of the process of associating the work procedure manual and the video with each other can be increased.

Except for the above-described features, the second embodiment is the same as the first embodiment described earlier.

Third Embodiment

Figure 24:
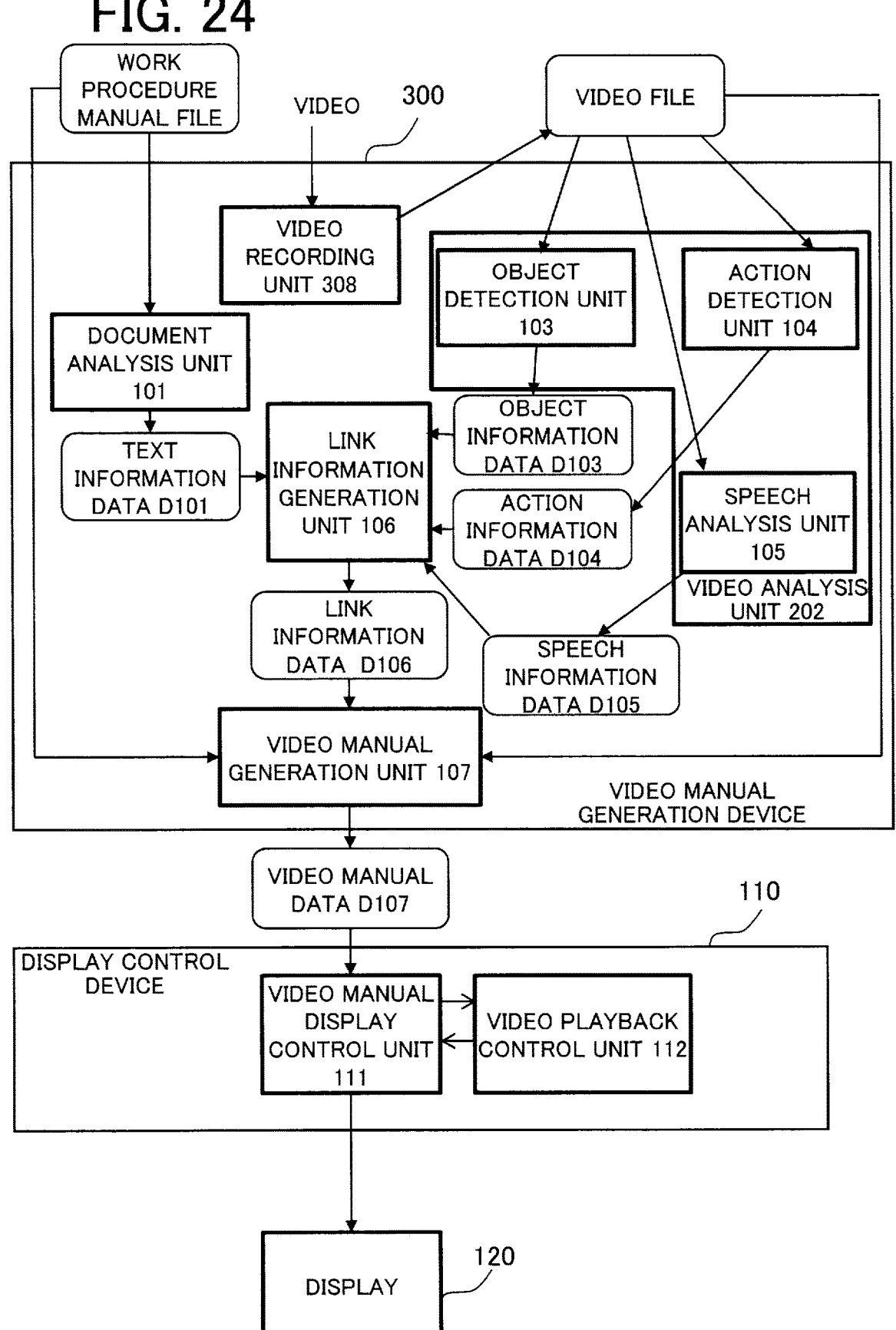
FIG. 24 is a functional block diagram schematically showing the configuration of a video manual generation device according to a third embodiment.

FIG. 24 is a functional block diagram schematically showing the configuration of a video manual generation device 300 according to a third embodiment. In FIG. 24, each component identical or corresponding to a component shown in FIG. 19 is assigned the same reference character as in FIG. 19. The video manual generation device 300 is a device capable of executing a video manual generation method according to the third embodiment. The video manual generation device 300 differs from the video manual generation device 200 according to the second embodiment in including a video recording unit 308 that records video captured by a camera and in that the recorded video is analyzed by the video analysis unit 202. The video manual data D107 generated by the video manual generation device 300 is outputted to the display control device 110. The video manual generation device 300, the display control device 110 and the display 120 constitute a video manual presentation system that presents the video manual to a person (e.g., worker). Further, the display control device 110 can also be provided as a part of the video manual generation device 300.

Figure 25:
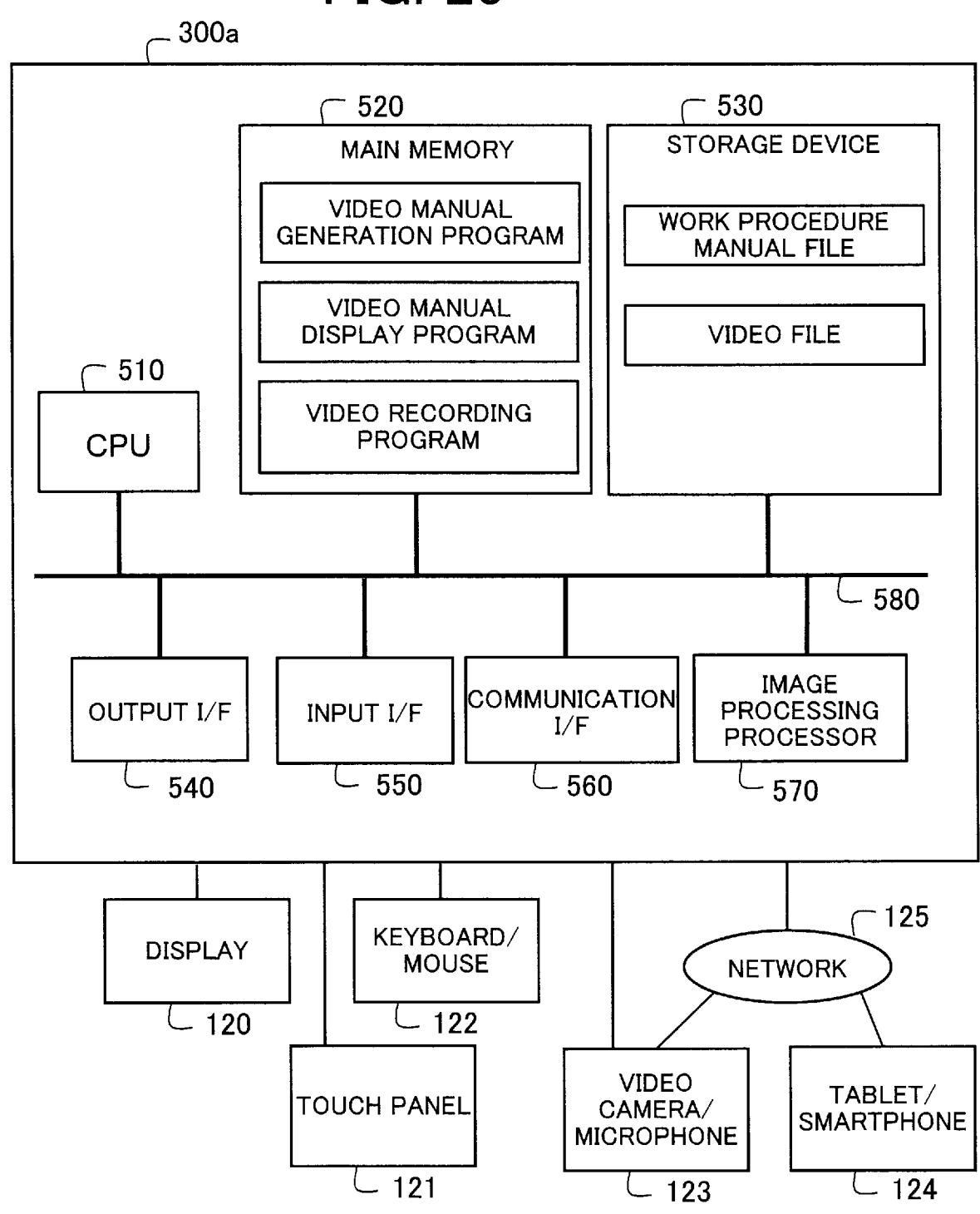
FIG. 25 is a diagram showing an example of the hardware configuration of a system (e.g., computer) implementing the video manual generation device and the display control device according to the third embodiment.

FIG. 25 is a diagram showing an example of the hardware configuration of a system (e.g., computer) 300a implementing the video manual generation device 300 and the display control device 110 according to the third embodiment. In FIG. 25, each component identical or corresponding to a component shown in FIG. 20 is assigned the same reference character as in FIG. 20. The system 300a in FIG. 25 differs from the system 200a in FIG. 20 in that the video analysis 202 generates video manual data by using the video file received from a video recording unit 308.

Figure 26:
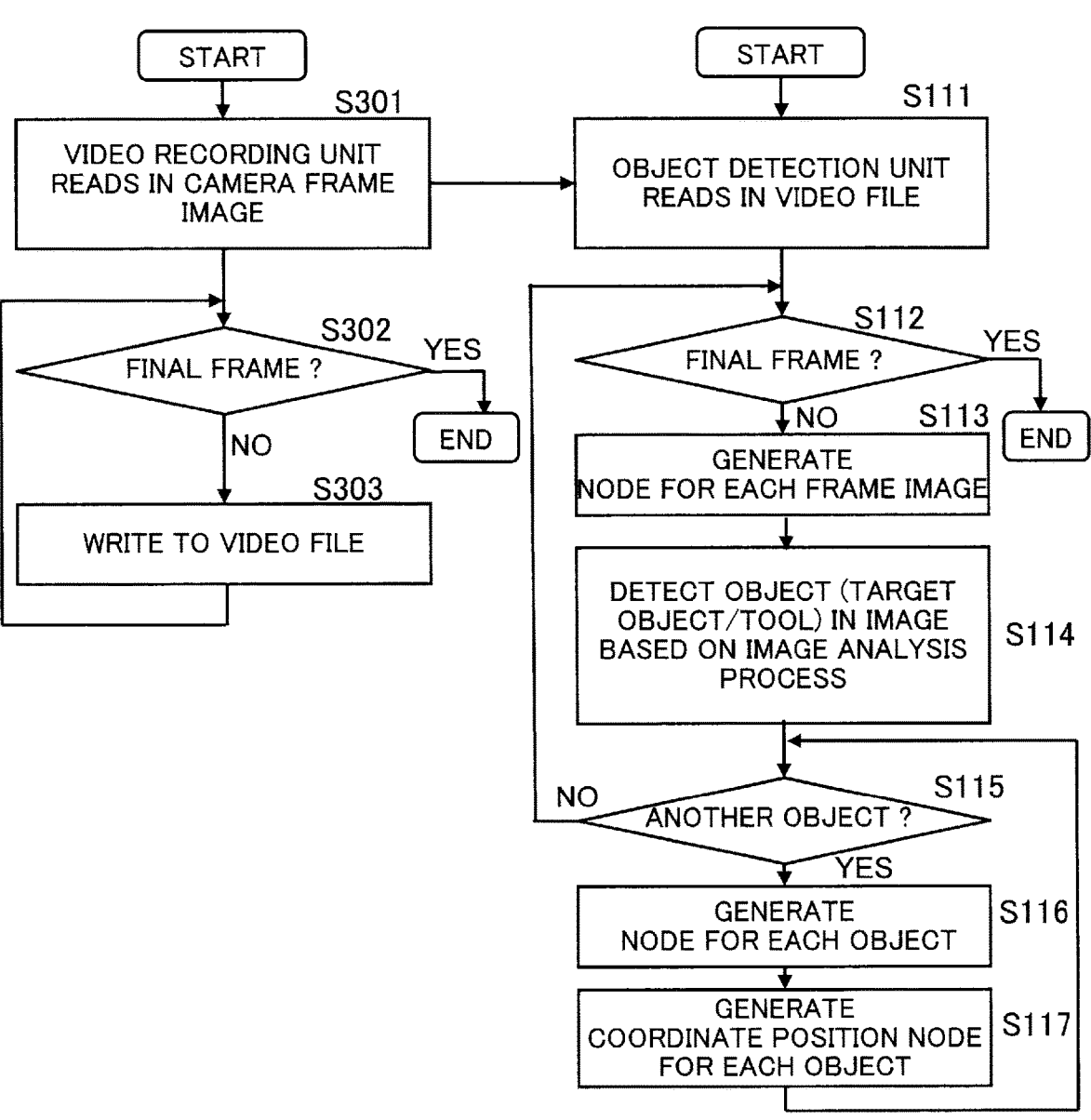
FIG. 26 is a flowchart showing a parallel process executed by a video recording unit and an object detection unit in the video manual generation device according to the third embodiment.

FIG. 26 is a flowchart showing a parallel process executed by the video recording unit 308 and the object detection unit 103 in the video manual generation device 300 according to the third embodiment. In FIG. 26, each step that is the same as a step shown in FIG. 11 is assigned the same step number as in FIG. 11. The video manual generation device 300 differs from the video manual generation device 200 according to the second embodiment in that the video recording unit 308 reads in images captured by a camera, the video file is written to the storage device 530 until the final frame, and the video analysis unit 202 reads in the video file received from the video recording unit 308.

The video manual generation device 300 according to the third embodiment is provided with a video recording program, and a video captured by a camera is recorded in the storage device 530. Thereafter, the video manual generation device 300 associates the work procedure manual and the work video currently captured by the camera with each other according to a video manual generation program. Therefore, the worker can perform camera recording start/stop operations at the worksite and check the correspondence between the video in which the worker himself/herself has been captured and the contents of the work in the work procedure manual, possible improvements, and so forth on the video manual (in this case, a video part is video of the worker himself/herself) generated and displayed on the spot.

Further, since the video manual generation device 300 is configured to newly add a video camera to the worksite, capture video of working conditions of the worker himself/herself, and make the association between the work procedure manual and the currently captured work video, it is possible to warn of an omission of a work item or an error in consideration of the contents of the work procedure manual and correct the error. As above, the video manual generation device 300 is provided with the function of recording video and thereby enabled to not only present the work video manual but also exert an educational effect on the worker himself/herself.

Except for the above-described features, the third embodiment is the same as the first or second embodiment described earlier.

Fourth Embodiment

Figure 27:
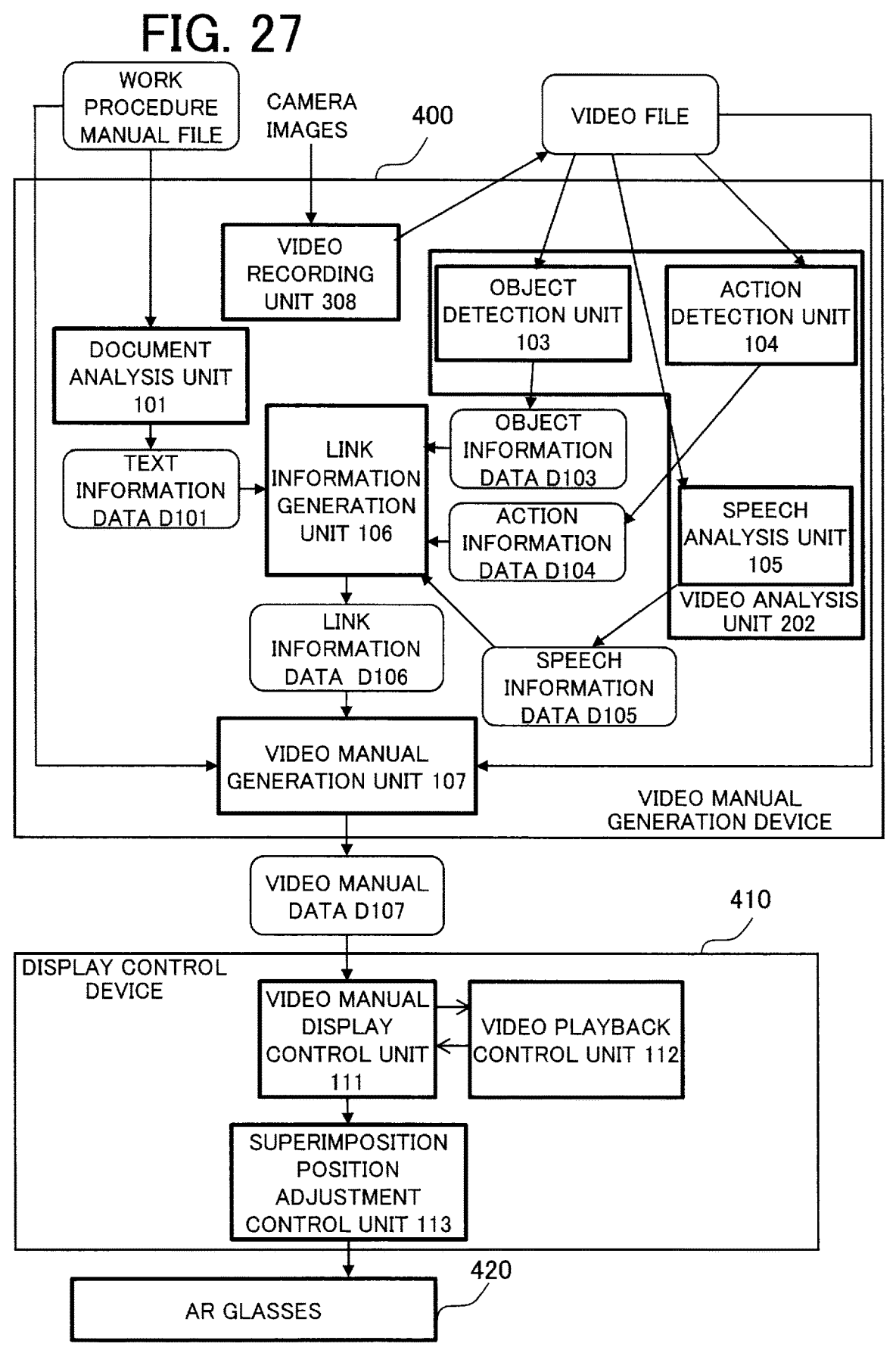

FIG. 27 is a functional block diagram schematically showing the configuration of a video manual generation device 400 according to a fourth embodiment. In FIG. 27, each component identical or corresponding to a component shown in FIG. 24 is assigned the same reference character as in FIG. 24. The video manual generation device 400 is a device capable of executing a video manual generation method according to the fourth embodiment. The video manual generation device 400, a display control device 410 and AR (Augmented Reality) glasses 420 constitute a video manual presentation system that presents a video manual to a person (e.g., worker). The video manual presentation system in the fourth embodiment differs from the video manual presentation system in the third embodiment in employing the AR glasses 420 and the display control device 410 that makes the AR glasses 420 display images. Further, the display control device 410 can also be provided as a part of the video manual generation device 400.

Figure 28:
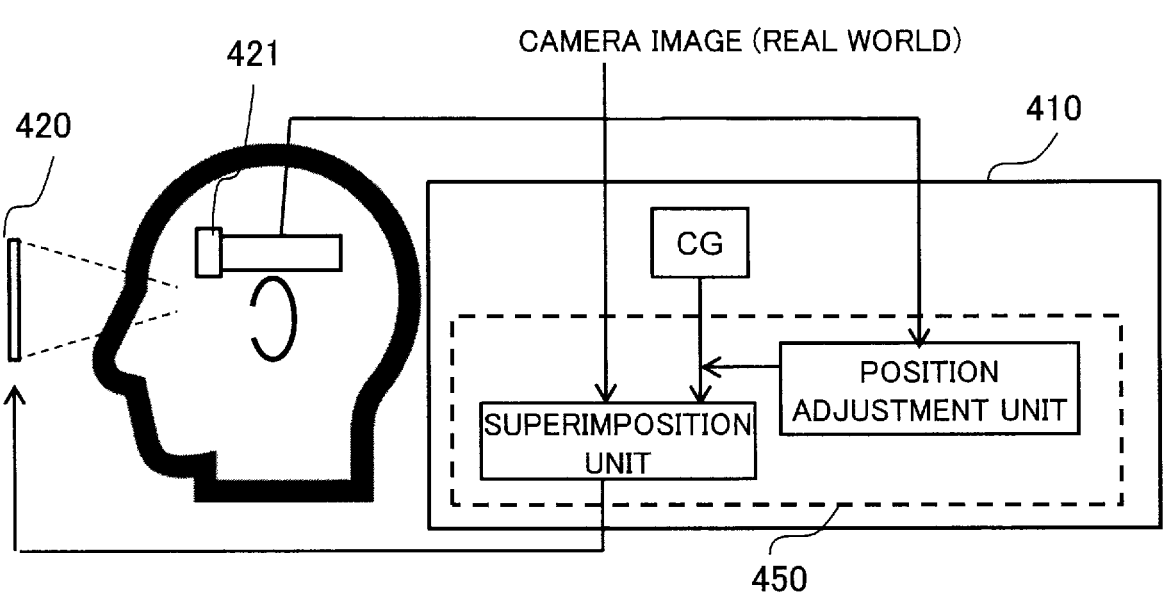
FIG. 28 is a diagram showing the configuration of a display control device for making AR (Augmented Reality) glasses display a video manual generated by the video manual generation device according to the fourth embodiment.

FIG. 28 is a diagram showing the configuration of the display control device 410 for making the AR glasses 420 display the video manual generated by the video manual generation device 400 according to the fourth embodiment. The AR glasses 420 are referred to also as smart glasses and have a function of letting a person view the real world in front of the person and an image superimposed on the real world (e.g., commentary text superimposed on a target object in the real world) at the same time. Further, the AR glasses 420 are provided with a camera (i.e., video camera) 421 that captures video of a scene in the same direction as the line of sight of the person wearing the AR glasses. In the fourth embodiment, the display control device 410 displays an AR image of the video manual or a part of the video manual in superimposition with an object in the real world viewed in the direction of the person's line of sight. The AR image includes, for example, a display component such as a frame, an arrow or the like for the emphasis display of an object in the real world. The display control device 410 controls the state of the display such as the color of the display component and the presence/absence of blinking of the display component. To implement such functions, the display control device 410 includes a position adjustment unit that registers (aligns) CG (Computer Graphics) with the real scenery and a superimposition unit that displays the CG in superimposition with a camera image or the real world. The position adjustment unit and the superimposition unit constitute a superimposition position adjustment control unit 113. The position adjustment process is executed according to a superimposition position adjustment program, for example. In the position adjustment process, a position adjustment process for the emphasis display (superimposition display) is executed, in which the video captured by the camera 421 is analyzed and position information viewed from the worker's line of sight is successively calculated based on position information regarding each object captured in the camera image.

Figure 29:
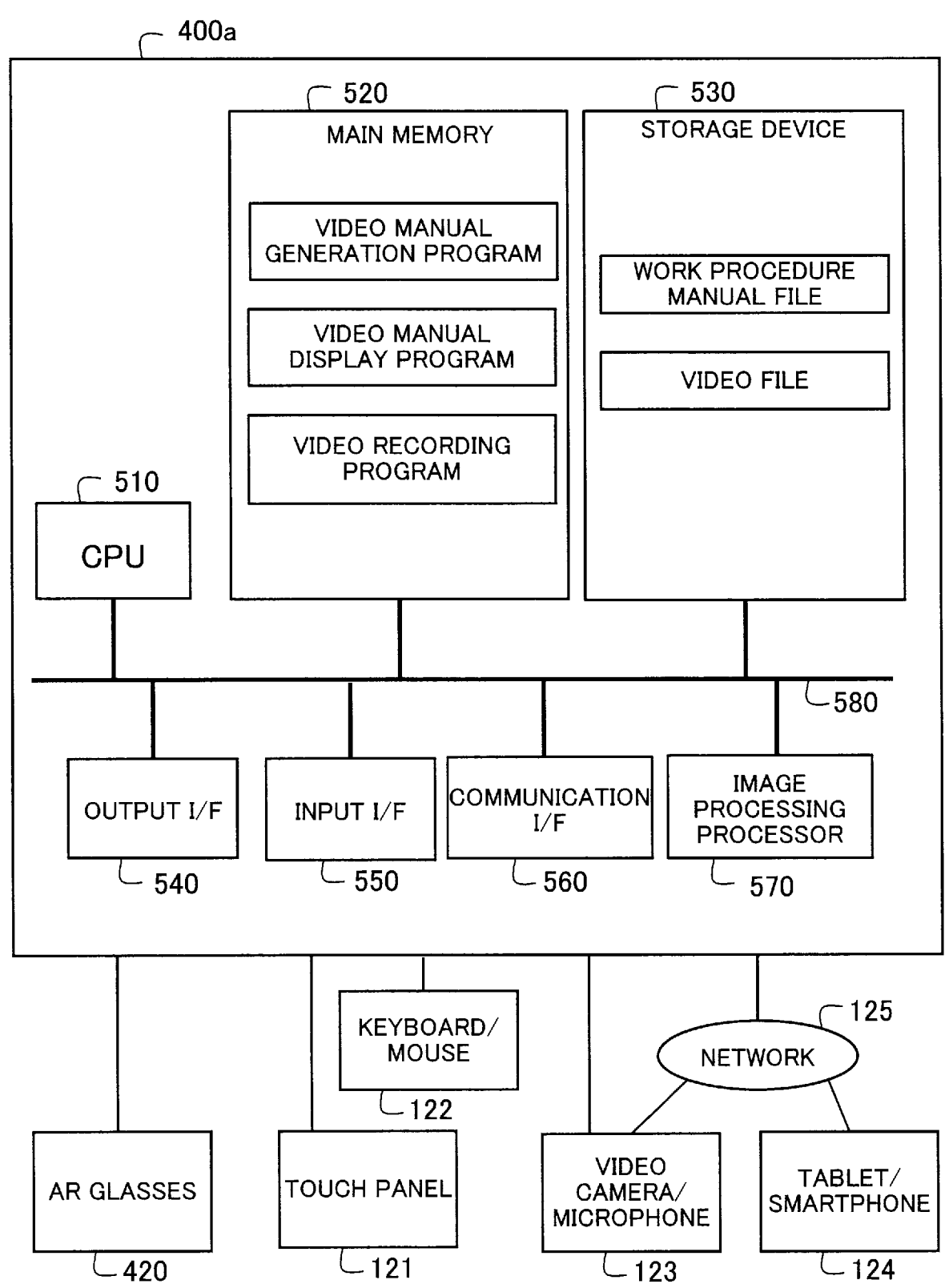
FIG. 29 is a diagram showing an example of the hardware configuration of a system (e.g., computer) implementing the video manual generation device and the display control device according to the fourth embodiment.

FIG. 29 is a diagram showing an example of the hardware configuration of a system (e.g., computer) 400a implementing the video manual generation device 400 and the display control device 410 according to the fourth embodiment. In FIG. 29, each component identical or corresponding to a component shown in FIG. 25 is assigned the same reference character as in FIG. 25. The system 400a in FIG. 29 differs from the system 300a in FIG. 25 in that the video manual is displayed by the AR glasses 420.

FIG. 30 is a flowchart showing a process executed by the superimposition position adjustment control unit 113 of the video manual generation device 400 according to the fourth embodiment. First, the video recording unit 308 reads in a frame image for the video manual captured by the camera (step S401). If there is an end command (YES in step S402), the superimposition position adjustment control unit 113 makes the AR glasses 420 display a see-through screen and ends the AR image display process.

If the superimposition position adjustment control unit 113 receives no end command (NO in the step S402), the object detection unit 103 detects an object (e.g., target object/tool) in the frame image (step S404) and acquires position information on each detected object in the frame image (step S405).

Subsequently, the superimposition position adjustment control unit 113 controls the position adjustment for posture correction (step S406), superimposes (i.e., synthesizes) the CG as the AR image on an appropriate position of each detected object (step S407), and has the image displayed on the screen of the AR glasses 420 (step S408).

As described above, the video manual generation device according to the fourth embodiment is provided with the AR glasses 420, the video camera 421 captures video of the worksite from the worker's viewpoint, and the AR glasses 420 have a transparent (see-through) screen. Then, it is possible to display digital (CG) data such as text, image or video in superimposition with the real world while also letting the worker view (e.g., view through the transparent screen) the real world in front of the worker.

A beginner of the work can hear the "procedure" (contents of the work) in the work procedure manual as speech from a speaker adjunct to the camera 421 of the AR glasses 420, for example, and a display component for the emphasis display is displayed in superimposition with an object (e.g., a target object or a tool) in the real world viewed in the direction of the line of sight in a mode in which their display positions are registered with each other. The display component can be, for example, a frame surrounding a region that is desired to be emphasized, the color of a region that is desired to be emphasized, blinking of a display component such as a frame, an arrow indicating a region that is desired to be emphasized, or the like.

By employing the AR glasses 420, an object (a target object, a tool or the like) viewed in the direction of the worker's line of sight is displayed in the emphasis display in the mode in which the display positions are registered with each other, and thus even when the worker is a beginner, the worker is enabled to visually, easily and correctly identify a component, a material, a tool and the like. Accordingly, work errors can be avoided and puzzlement, confusion and the like are reduced, and thus the work can be advanced efficiently.

Except for the above-described features, the fourth embodiment is the same as any one of the first to third embodiments.

Modification

While examples in which the data is a tree structure are described in the above embodiments, the data can also be data other than a tree structure.

DESCRIPTION OF REFERENCE CHARACTERS 100, 200, 300, 400: video manual generation device, 101: document analysis unit, 102, 202: video analysis unit, 103: object detection unit, 104: action detection unit, 105: speech analysis unit, 106: link information generation unit, 107: video manual generation unit, 110, 410: display control device, 120: display, 150: first set, 160a, 160b: second set, 420: AR glasses, 421: camera, 510: CPU, 520: main memory, 530: storage device.

What is claimed is:

1. A video manual generation device comprising:
processing circuitry
to analyze a work procedure manual file in which a work procedure is described and to generate text information data indicating a structure of text included in the work procedure manual file;
to analyze a video file of video that is obtained by camera recording of a person executing a work according to the work procedure, to generate object information data including an on-screen coordinate position and a name of an object, the on-screen coordinate position representing positions of a target object of the work, a tool used for the work, and a body part of the person on each frame image, and to generate action information data representing an action of the person included in the video, the action including a coordinate position of the body part and a movement direction of the body part;
to collect first sets each being a set of a noun and a verb included in the text from the text information data, to collect second sets each being a set of the on-screen coordinate position and the name of the object and the action included in the video from the object information data and the action information data, to search the collected first sets and the collected second sets for a first set and a second set in which the noun and the name of the object correspond to each other and the verb and the action correspond to each other, and to generate link information data indicating correspondence between a position in the work procedure where the first set obtained by the search is described and a scene in the video that includes the second set obtained by the search; and
to generate video manual data, for causing a display to display a video manual including the work procedure, the video, the noun displayed in the vicinity of the object in each first frame image of the video, and the verb displayed in the vicinity of the body part executing the action corresponding to the verb in each second frame image of the video, based on the link information data, wherein each first frame image in which the noun is displayed is different from each second frame image in which the verb is displayed.

2. The video manual generation device according to claim 1, wherein
the noun is a word indicating the name of the object, and the verb is a word indicating the action of the person.

3. The video manual generation device according claim 1, wherein
the processing circuitry generates speech information data representing speech included in the video file, and the processing circuitry
collects speech keywords included in the speech information data,
searches the text information data for the noun and the verb corresponding to the speech keyword, and
generates the link information data indicating correspondence among positions of the noun and the verb obtained by the search in the work procedure, a scene in the video, and the speech keyword.

4. The video manual generation device according to claim 1, wherein
the processing circuitry records a video capture file obtained by camera recording of the person, in a storage device, and the video file is the video capture file recorded in the storage device.

5. The video manual generation device according to claim 1, wherein the processing circuitry causes the display to display the video manual or a part of the video manual as augmented reality information as an augmented reality image in superimposition with a real object viewed in a direction of the person's line of sight.

6. The video manual generation device according to claim 5, wherein the augmented reality image includes an emphasis display that emphasizes the real object, and the processing circuitry switches a state of display of the emphasis display.

7. A video manual generation method executed by a video manual generation device that generates video manual data, the video manual generation method comprising:

analyzing a work procedure manual file in which a work procedure is described and generating text information data indicating a structure of text included in the work procedure manual file;

analyzing a video file of video that is obtained by camera recording of a person executing a work according to the work procedure, generating object information data including an on-screen coordinate position and a name of an object, the on-screen coordinate position representing positions of a target object of the work, a tool used for the work, and a body part of the person on each frame image, and generating action information data representing an action of the person included in the video, the action including a coordinate position of the body part and a movement direction of the body part;

collecting first sets each being a set of a noun and a verb included in the text from the text information data, collecting second sets each being a set of the on-screen coordinate position and the name of the object and the action included in the video from the object information data and the action information data, searching the collected first sets and the collected second sets for a first set and a second set in which the noun and the name of the object correspond to each other and the verb and the action correspond to each other, and generating link information data indicating correspondence between a position in the work procedure where the first set obtained by the search is described and a scene in the video that includes the second set obtained by the search; and generating video manual data, for causing a display to display a video manual including the work procedure, the video, the noun displayed in the vicinity of the object in each first frame image of the video, and the verb displayed in the vicinity of the body part executing the action corresponding to the verb in each second frame image of the video, based on the link information data, wherein each first frame image in which the noun is displayed is different from each second frame image in which the verb is displayed.

8. A non-transitory computer-readable storage medium storing a video manual generation program that causes a computer to execute:

analyzing a work procedure manual file in which a work procedure is described and generating text information data indicating a structure of text included in the work procedure manual file;

analyzing a video file of video that is obtained by camera recording of a person executing a work according to the work procedure, generating object information data including an on-screen coordinate position and a name of an object, the on-screen coordinate position representing positions of a target object of the work, a tool used for the work, and a body part of the person on each frame image, and generating action information data representing an action of the person included in the video, the action including a coordinate position of the body part and a movement direction of the body part;

collecting first sets each being a set of a noun and a verb included in the text from the text information data, collecting second sets each being a set of the on-screen coordinate position and the name of the object and the action included in the video from the object information data and the action information data, searching the collected first sets and the collected second sets for a first set and a second set in which the noun and the name of the object correspond to each other and the verb and the action correspond to each other, and generating link information data indicating correspondence between a position in the work procedure where the first set obtained by the search is described and a scene in the video that includes the second set obtained by the search; and generating video manual data, for causing a display to display a video manual including the work procedure, the video, the noun displayed in the vicinity of the object in each first frame image of the video, and the verb displayed in the vicinity of the body part executing the action corresponding to the verb in each second frame image of the video, based on the link information data, wherein each first frame image in which the noun is displayed is different from each second frame image in which the verb is displayed.

* * * * *